US012743228B2

(12) United States Patent
Huang et al.

(10) Patent No.: US 12,743,228 B2
(45) Date of Patent: Sep. 22, 2026

(54) DATA ACCESS METHOD AND SYSTEM

(71) Applicant: Huawei Cloud Computing Technologies Co., Ltd., Guizhou (CN)

(72) Inventors: Bin Huang, Chengdu (CN); Lin Wu, Chengdu (CN); Shining Wan, Chengdu (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 7 days.

(21) Appl. No.: 19/066,691

(22) Filed: Feb. 28, 2025

(65) Prior Publication Data

US 2025/0199715 A1 Jun. 19, 2025

Related U.S. Application Data

(63) Continuation of application No. PCT/CN2023/105005, filed on Jun. 30, 2023.

(30) Foreign Application Priority Data

Aug. 30, 2022 (CN) ........................ 202211047879.6

(51) Int. Cl.
*G06F 12/00* (2006.01)
*G06F 3/06* (2006.01)

(52) U.S. Cl.
CPC .......... *G06F 3/0655* (2013.01); *G06F 3/0604* (2013.01); *G06F 3/0682* (2013.01)

(58) Field of Classification Search
CPC .... G06F 3/0655; G06F 3/0604; G06F 3/0682; G06F 3/061; G06F 3/0619; G06F 3/0644; G06F 3/065; G06F 3/0686; G06F 3/067; G06F 3/0676
See application file for complete search history.

(56) References Cited

U.S. PATENT DOCUMENTS

2003/0128454 A1* 7/2003 Basham ................ G06F 3/0601
2015/0193145 A1* 7/2015 Johnson ................ G06F 3/0659 360/49
2017/0206038 A1 7/2017 Bates et al.
2022/0415357 A1* 12/2022 Goker ................. G11B 5/5565

FOREIGN PATENT DOCUMENTS

CN 105765575 A 7/2016

* cited by examiner

*Primary Examiner* — Shawn X Gu
(74) *Attorney, Agent, or Firm* — Conley Rose, P.C.

(57) ABSTRACT

A data access method includes a target storage node that determines at least one data access policy input or selected by a user on a management platform. The target storage node receives a first write data stream from a request client, where the first write data stream indicates a first tape, first data to be written into the first tape, and first tape space required by the first data, the first tape space belongs to a same data partition. The target storage node writes the first data into the first tape according to the at least one data access policy using a first tape drive in at least one tape drive.

20 Claims, 12 Drawing Sheets

FIG. 8

Write data stream 1

Write data stream 2

Tape drive 1

Tape drive 2

Tape drive 3

Range 0–8

Tape drive 1

Tape drive 2

Tape drive 3

Range 8–16

Tape drive 1

Tape drive 2

Tape drive 3

Range 16–24

DATA ACCESS METHOD AND SYSTEM

CROSS-REFERENCE TO RELATED APPLICATIONS

This is a continuation of International Patent Application No. PCT/CN2023/105005 filed on Jun. 30, 2023, which claims priority to Chinese Patent Application No. 202211047879.6 filed on Aug. 30, 2022, both of which are incorporated by reference.

TECHNICAL FIELD

This disclosure relates to the field of storage technologies, and in particular, to a data access method and system.

BACKGROUND

With development of computer storage technologies, a tape capacity keeps increasing. Currently, the tape capacity can reach dozens of terabytes (TBs), which has reached/exceeded a hard disk capacity. In comparison with hard disk storage, a tape storage technology has the following advantages: almost no power is consumed in an idle state; there are lower costs and higher data storage time and reliability with a same capacity; and a data transmission speed (where a Linear Tape-Open 8 (LTO-8) tape is used as an example) can reach 360 megabytes per second (MB/s), and is higher than a transmission speed of another hard disk. Tape winding may need to be involved for a tape to access discrete data. To find discrete data on a tape of hundreds of meters, it usually takes several minutes for tape winding. This is much longer than seek time of the discrete data on the tape. Therefore, the tape is not suitable for a random read/write scenario, and is more suitable for cold storage.

A tape library system consists of a plurality of tape drives, robotic arms, and tapes. A tape to be accessed may need to be moved to the tape drive via a robotic arm, and then the tape is accessed via the tape drive. Costs of the tape drive are much higher than those of the tape. Generally, one tape library is configured with a limited quantity of tape drives. Therefore, a plurality of tapes may need to share one tape drive. However, in this application scenario, when concurrent service access or a read/write conflict occurs, tape switching/tape winding may need to be frequently performed, or a problem such as uneven wear of the tape drive may occur.

SUMMARY

Embodiments of this disclosure provide a data access method and system, to help reduce operations such as tape switching/tape winding, and prolong a service life of a tape drive.

According to a first aspect, an embodiment of this disclosure provides a data access method. The method may include a target storage node that determines at least one data access policy input or selected by a user on a management platform. The target storage node receives a first write data stream, where the first write data stream indicates a first tape, first data to be written into the first tape, and first tape space required by the first data, the first tape space belongs to a same data partition, and the data partition is distributed on at least one storage node in a storage node cluster to which the target storage node belongs. The target storage node writes the first data into the first tape according to the at least one data access policy using a first tape drive in at least one tape drive.

According to the foregoing method, single tape space is no longer split, but belongs to one partition at an entire space granularity, such that when a request client performs data access to the target storage node, tape switching/tape winding operations of the target storage node are reduced, and system performance is improved by reducing seek time.

With reference to the first aspect, in a possible design, a concurrency quantity of different write data streams received by the target storage node is less than or equal to a first value, and the first value is a minimum value of quantities of tape drives of a plurality of storage nodes included in the storage node cluster.

According to the foregoing method, resource separation is performed on different data streams, such that the different data streams are distributed on different tapes in a concurrent access manner, and performance of a tape drive is brought into play. In addition, a quantity of concurrent accesses is limited, to reduce access conflicts as much as possible.

With reference to the first aspect, in a possible design, the at least one data access policy includes either of the following load balancing policies: a ping-pong policy or a round-robin policy, and the load balancing policy is for performing load balancing on the different write data streams received by the target storage node.

According to the foregoing method, the load balancing policy is applied to the at least one tape drive, such that each tape drive does not operate continuously for a long time, and a service life of the tape drive is prolonged. It should be noted that, in embodiments of this disclosure, the load balancing policy is configurable, and is not limited to the foregoing examples.

With reference to the first aspect, in a possible design, the at least one data access policy includes a first scheduling policy, and that the target storage node writes the first data into the first tape according to the at least one data access policy using a first tape drive in at least one tape drive includes: When the first tape is faulty, the target storage node suspends, according to the first scheduling policy, receiving a write request corresponding to the first write data stream. After the first tape is switched to a new second tape, the target storage node resumes receiving the write request corresponding to the first write data stream, and writes the first data of the first write data stream into the second tape.

According to the foregoing method, the target storage node may sense a case such as a conflict or a fault of a back-end tape, and when a tape of a current write data stream is faulty, dynamically switch the tape according to the first scheduling policy, to improve hardware utilization and reduce impact on a client service.

With reference to the first aspect, in a possible design, redundancy backup is performed on the first write data stream using either of the following redundancy policies: multi-copy or erasure code, the at least one data access policy includes a second scheduling policy, and that the target storage node writes the first data into the first tape according to the at least one data access policy using a first tape drive in at least one tape drive includes: When the first tape drive is faulty, the target storage node suspends, according to the second scheduling policy, receiving the write request corresponding to the first write data stream. The target storage node notifies an associated storage node to mark an associated tape drive of the first write data stream as an idle state, where the associated storage node is a storage node that is in the storage node cluster and that is configured to perform redundancy backup on the first write data stream, and the associated tape drive is a first tape drive of the associated storage node.

According to the foregoing method, the target storage node may sense the case such as the conflict or the fault of the back-end tape, and when a tape drive of the current write data stream is faulty, dynamically switch the tape according to the second scheduling policy, to improve the hardware utilization and reduce the impact on the client service.

With reference to the first aspect, in a possible design, the method further includes: The target storage node receives a read request, where the read request indicates a third tape and an on-tape offset address in which to-be-read second data is located. The target storage node reads the second data from the first tape using a third tape drive in the at least one tape drive based on the on-tape offset address indicated by the read request.

With reference to the first aspect, in a possible design, the at least one data access policy includes a third scheduling policy, and the third scheduling policy indicates that the third tape drive is an idle tape drive of the target storage node.

With reference to the first aspect, in a possible design, the at least one data access policy includes a fourth scheduling policy, and that the target storage node writes the first data into the first tape according to the at least one data access policy using a first tape drive in at least one tape drive includes: When the third tape is the same as the first tape, the target storage node suspends, according to the fourth scheduling policy, receiving the write request corresponding to the first write data stream. After the received first data of the first write data stream is written, the target storage node executes the read request using the third tape drive, to read the second data from the first tape, where the third tape drive is the same as the first tape drive. After the read request is executed, the target storage node resumes receiving the write request corresponding to the first write data stream.

According to the foregoing method, the target storage node may sense the case such as the conflict or the fault of the back-end tape, and when there is a read/write conflict in the current write data stream, dynamically switch the tape according to the fourth scheduling policy, to improve the hardware utilization and reduce the impact on the client service.

With reference to the first aspect, in a possible design, the at least one data access policy includes a fifth scheduling policy, and that the target storage node writes the first data into the first tape according to the at least one data access policy using a first tape drive in at least one tape drive includes: When the third tape is different from the first tape and there is no idle tape drive in the at least one tape drive, the target storage node selects, according to the fifth scheduling policy, a tape drive corresponding to a second write data stream as the third tape drive, where the second write data stream belongs to at least one concurrent write data stream of the target storage node, and the second write data stream is the same as or different from the first write data stream. The target storage node suspends receiving a write request corresponding to the second write data stream. After the received second data of the second write data stream is written, the target storage node executes the read request using the third tape drive. After the read request is executed, the target storage node resumes receiving the write request corresponding to the first write data stream.

According to the foregoing method, the target storage node may sense the case such as the conflict or the fault of the back-end tape, and when there is a read/write conflict in the current write data stream, dynamically switch the tape according to the fifth scheduling policy, to improve the hardware utilization and reduce the impact on the client service.

With reference to the first aspect, in a possible design, that a target storage node determines at least one data access policy input or selected by a user on a management platform includes: The target storage node receives the at least one data access policy sent by the user, where the at least one data access policy includes a plurality of fields and a parameter input by the user for each field, the plurality of fields are associated with an application programming interface (API) of the at least one data access policy, the API is provided by the management platform, and the plurality of fields represent different attributes of the at least one data access policy.

With reference to the first aspect, in a possible design, that a target storage node determines at least one data access policy input or selected by a user on a management platform includes: The target storage node determines the at least one data access policy input or entered by the user on a console interface, where the console interface is provided by the management platform, and the at least one data access policy includes a plurality of indicator attribute configuration items provided by the console interface and a parameter input or selected by the user for each indicator attribute configuration item.

According to a second aspect, an embodiment of this disclosure provides a data access system, including: a management platform, configured to determine at least one data access policy input or selected by a user on the management platform; and a target storage node, configured to: receive a first write data stream, where the first write data stream indicates a first tape, first data to be written into the first tape, and first tape space required by the first data, the first tape space belongs to a same data partition, and the data partition is distributed on at least one storage node in a storage node cluster to which the target storage node belongs; and write the first data into the first tape according to the at least one data access policy using a first tape drive in at least one tape drive.

With reference to the second aspect, in a possible design, a concurrency quantity of different write data streams received by the target storage node is less than or equal to a first value, and the first value is a minimum value of quantities of tape drives of a plurality of storage nodes included in the storage node cluster.

With reference to the second aspect, in a possible design, the at least one data access policy includes either of the following load balancing policies: a ping-pong policy or a round-robin policy, and the load balancing policy is for performing load balancing on the different write data streams received by the target storage node.

With reference to the second aspect, in a possible design, the at least one data access policy includes a first scheduling policy, and the target storage node is configured to: when the first tape is faulty, suspend, according to the first scheduling policy, receiving a write request corresponding to the first write data stream; and after the first tape is switched to a new second tape, resume receiving the write request corresponding to the first write data stream, and write the first data of the first write data stream into the second tape.

With reference to the second aspect, in a possible design, redundancy backup is performed on the first write data stream using either of the following redundancy policies: multi-copy or erasure code, the at least one data access policy includes a second scheduling policy, and the target storage node is configured to: when the first tape drive is faulty, suspend, according to the second scheduling policy, receiving the write request corresponding to the first write data stream; and notify an associated storage node to mark an associated tape drive of the first write data stream as an idle state, where the associated storage node is a storage node that is in the storage node cluster and that is configured to perform redundancy backup on the first write data stream, and the associated tape drive is a first tape drive of the associated storage node.

With reference to the second aspect, in a possible design, the target storage node is further configured to: receive a read request, where the read request indicates a third tape and an on-tape offset address in which to-be-read second data is located; and read the second data from the first tape using a third tape drive in the at least one tape drive based on the on-tape offset address indicated by the read request.

With reference to the second aspect, in a possible design, the at least one data access policy includes a third scheduling policy, and the third scheduling policy indicates that the third tape drive is an idle tape drive of the target storage node.

With reference to the second aspect, in a possible design, the at least one data access policy includes a fourth scheduling policy, and the target storage node is configured to: when the third tape is the same as the first tape, suspend, according to the fourth scheduling policy, receiving the write request corresponding to the first write data stream; after the received first data of the first write data stream is written, execute the read request using the third tape drive, to read the second data from the first tape, where the third tape drive is the same as the first tape drive; and after the read request is executed, resume receiving the write request corresponding to the first write data stream.

With reference to the second aspect, in a possible design, the at least one data access policy includes a fifth scheduling policy, and the target storage node is configured to: when the third tape is different from the first tape and there is no idle tape drive in the at least one tape drive, select, according to the fifth scheduling policy, a tape drive corresponding to a second write data stream as the third tape drive, where the second write data stream belongs to at least one concurrent write data stream of the target storage node, and the second write data stream is the same as or different from the first write data stream; suspend receiving a write request corresponding to the second write data stream; after the received second data of the second write data stream is written, execute the read request using the third tape drive; and after the read request is executed, resume receiving the write request corresponding to the first write data stream.

With reference to the second aspect, in a possible design, the management platform is configured to: provide an API for the user, where the API indicates a plurality of fields representing different attributes of the at least one data access policy; and the target storage node is configured to receive the at least one data access policy sent by the user, where the at least one data access policy includes a plurality of fields and a parameter input by the user for each field.

With reference to the second aspect, in a possible design, the management platform is configured to provide a console interface for the user; and the target storage node is configured to determine the at least one data access policy selected or input by the user on the console interface, where the at least one data access policy includes a plurality of indicator attribute configuration items provided by the console interface and a parameter input or selected by the user for each indicator attribute configuration item.

According to a third aspect, an embodiment of this disclosure provides a computing device cluster, including at least one computing device. Each computing device includes a processor and a memory. A processor of the at least one computing device is configured to execute instructions stored in a memory of the at least one computing device, such that the computing device cluster performs the method in the first aspect and any one of the possible designs of the first aspect.

According to a fourth aspect, an embodiment of this disclosure provides a computer program product including instructions. When the instructions are run by a computing device cluster, the computing device cluster is caused to perform the method in the first aspect and any one of the possible designs of the first aspect.

According to a fifth aspect, an embodiment of this disclosure provides a computer-readable storage medium, including computer program instructions. When the computer program instructions are executed by a computing device cluster, the computing device cluster performs the method in the first aspect and any one of the possible designs of the first aspect.

BRIEF DESCRIPTION OF DRAWINGS

FIG. 8 is a diagram of a console interface according to an embodiment of this disclosure;

DESCRIPTION OF EMBODIMENTS

Figure 1:
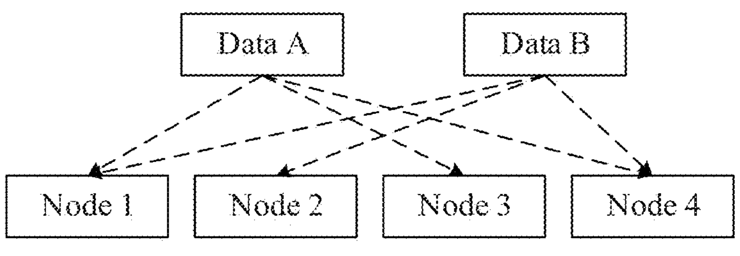
FIG. 1 is a diagram of a multi-copy-based redundancy backup policy.

For ease of understanding of the technical solutions in embodiments of this disclosure, the following first describes some terms in embodiments of this disclosure.

1. Hard Disk

The hard disk is a data storage device that uses magnetic media. Data is stored on several disk sheets sealed in a clean hard disk drive cavity. These disk sheets are generally formed by coating the magnetic media on base surfaces of the magnet plates. On each surface of the magnet plate, several concentric circles with a rotation axis as an axis and a specific magnet density as an interval are considered as tracks, each track is divided into several sectors, and data is stored on the hard disk by sector. There is one corresponding read/write head on each surface. Therefore, all tracks that are in same locations and that are of different heads form a cylinder. Traditional hard disk read/write uses a cylinder-head-sector addressing (CHS addressing) mode. After being powered on, the hard disk rotates at a high speed. A head on a head arm is suspended on a surface of a disk. A stepper motor may move between different cylinders, to read/write data on the different cylinders.

2. Tape Library

In a broad sense, a tape library product includes an autoload tape drive and a tape library. The autoload tape drive and the tape library are actually an organic combination of a tape and a tape drive.

The autoload tape drive is a tape drive and an automatic tape replacement apparatus in a single machine, and can pick up a tape from a cartridge containing a plurality of tapes and insert the tape into a drive, or perform a reverse process. Generally, the autoload tape drive can back up data of approximately 3 terabyte (TB) to 6 TB, which is a capacity of a single tape. The autoload tape drive can support a routine backup process and automatically loads a new tape for a daily backup operation. A small company or branch office that has a work group server can use the autoload tape drive to automatically complete the backup operation.

The tape library is a tape-based backup system that is the same as the autoload tape drive. The tape library includes a plurality of drives (for example, which are referred to as tape drives), tapes, and robot control/changer, and the robot control/changer can automatically remove and fill tapes. The tape library can provide same basic automatic backup and data recovery functions, and has more advanced technical features. In the tape library, a plurality of drives may operate concurrently, or several drives may point to different servers for backup. A storage capacity reaches a petabyte (PB) level. The tape library may implement functions such as continuous backup and automatic tape search. In addition, the tape library can implement intelligent recovery, real-time monitoring, and statistics with support of management software, and is a main device for centralized network data backup.

3. Distributed Storage

In a distributed storage system, data shards are distributed and stored on a plurality of independent devices.

In another network storage system, a centralized storage server is used to store all data. The storage server becomes a bottleneck of system performance and also a focus of reliability and security, and cannot satisfy a requirement of a large-scale storage application. A distributed network storage system uses a scalable system structure, uses a plurality of storage servers (which are also referred to as storage nodes, and may be physical nodes (Nodes) or virtual nodes (VNodes)) to share storage load, and uses a location server to locate storage information. This not only improves system reliability, availability, and access efficiency, but also facilitates expansion.

4. Multi-Copy

The multi-copy is a common data protection mechanism in distributed storage.

The multi-copy, namely, a plurality of data copies, means that a plurality of identical copies of one piece of data are copied and stored on a plurality of different storage nodes. For example, as shown in FIG. 1, a commonly used three-copy technology is to copy three copies of data A, and store the three copies on a node 1, a node 3, and a node 4 respectively. The three nodes may be randomly selected from an entire storage node cluster. When the three-copy technology is used for a next piece of data B, data copies of the data B may be stored on the node 1, a node 2, and the node 4.

When N indicates a quantity of copies, an N-copy technology may ensure that data is not lost when N−1 nodes are faulty simultaneously. When a hard disk is faulty, data is not lost as long as a quantity of faulty hard disks does not exceed N−1. For example, when three disks on the node 1 are faulty and four disks on the node 3 are faulty, data is still not lost. This multi-copy data protection manner is easy to implement and has high reliability. Only when storage nodes on which all copies are located are all faulty, a service is affected; otherwise, data may be read from another copy that is not faulty, to ensure the service.

5. Erasure Code (EC)

The erasure code is a common data protection mechanism in distributed storage, is a forward error correction (FEC) technology, and is mainly applied to avoiding packet loss during network transmission. A storage system uses this technology to improve storage reliability.

Figure 2:
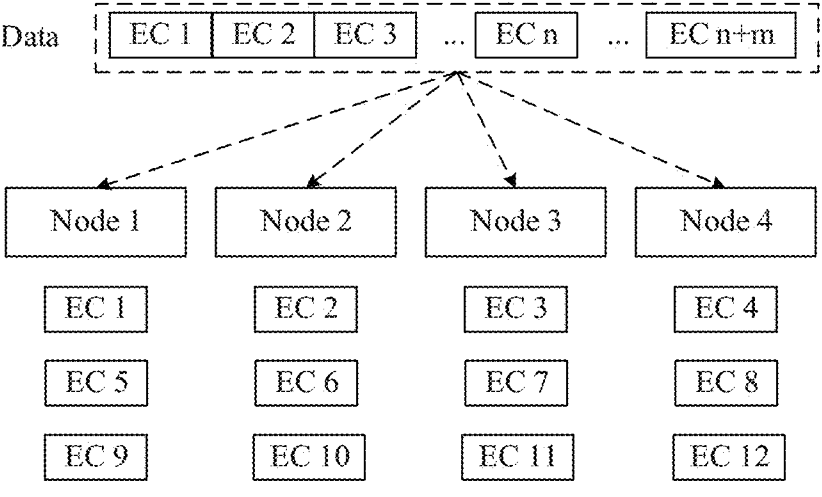
FIG. 2 is a diagram of an erasure code-based redundancy backup policy.

The erasure code means that m pieces of data are added to n pieces of original data, and any n pieces of data in n+m pieces of data can be restored to the original data. When the n+m pieces of data are distributed on different storage nodes of a storage system, when any m or fewer nodes are faulty (m pieces of data are invalid), the original data can be restored from other remaining data, such that a service is not affected. An EC algorithm may be flexibly configured. For example, when a system may need to support simultaneous faults of two nodes, m=2. As shown in FIG. 2, for example, n=10, and m=2. 12 pieces of data (for example, represented as EC 1, EC 2, EC 3, . . . , EC n, . . . , and EC n+m) may be stored on four nodes randomly (or in another manner). For example, EC 1, EC 5, and EC 9 are stored on a node 1, EC 2, EC 6, and EC 10 are stored on a node 2, EC 3, EC 7, and EC 11 are stored on a node 3, and EC 4, EC 8, and EC 12 are stored on a node 4.

In terms of space utilization, the EC is better than multi-copy. In an example of 4+2, space utilization is 4/(4+2) =67%. The utilization is twice that of a three-copy technology. In terms of reliability, the EC is the same as the three-copy technology, and can support simultaneous faults of two nodes as well. In comparison with multi-copy replication, the erasure code can obtain higher data reliability with smaller data redundancy, but has a complex encoding manner and requires a large amount of calculation. The erasure code can tolerate only data loss, but cannot tolerate data tampering. This is the reason for a name of erasure code.

Currently, there are three types of applications of an erasure code technology in a distributed storage system: array erasure code (Array Code), such as a RAID 5 and a RAID 6, Reed-Solomon (RS) erasure code, and low-density parity check (LDPC) erasure code. A RAID is a special case of the EC. A RAID supports malfunctions of only a limited quantity of disks. A RAID 5 supports a malfunction of only one disk, a RAID 6 supports malfunctions of two disks, and the EC supports malfunctions of a plurality of disks. The EC is mainly applied to fields of storage and digital coding, for example, disk array storage (the RAID 5 and the RAID 6) and cloud storage. The LDPC code can also provide a redundancy mechanism that ensures reliability well. In comparison with RS code, coding efficiency of the LDPC code is lower, but encoding performance and decoding performance of the LDPC code are better than those of the RS code and another erasure code. This is because XOR operations used for encoding and decoding are fewer and simple. Currently, the LDPC code is mainly applied to fields such as communication, video, and audio coding.

6. Partition

Partitioning is to divide a database or components of the database into different separate parts. Database partitioning is usually performed for reasons of manageability, performance, availability, or load balancing. In a distributed storage system, each partition may be distributed on a plurality of storage nodes, and a user on the storage node executes a local transaction on the partition. Overall system performance is improved due to data partitioning. Common partitioning algorithms include random partitioning, hash partitioning, range partitioning, round-robin partitioning, and customized partitioning.

It should be noted that, in embodiments of this disclosure, only that tape space of a tape belongs to one data partition at an overall space granularity may need to be limited, a division manner of the data partition is not limited, and a specific capacity of tape space that is of each tape and that is divided into one data partition is not limited.

7. Fibre Channel (FC)

The fibre channel is a high-speed data transmission protocol that provides ordered and lossless block data transmission. The fibre channel is mainly used for key services that require high reliability.

8. Serial Attached SCSI (SAS)

The serial bus is a point-to-point serial protocol for transmitting data through an SAS cable.

9. Data Stream

The data stream refers to a set of ordered bytes that have a start point and an end point. A program can use the data stream to receive data from a keyboard, write data to a file, and perform a read/write operation on data on a connected network.

10. User

Generally, the user refers to a management user of a distributed storage system.

When the distributed storage system is a system using a cloud technology, the user may include the management user and a tenant allowed to configure the distributed storage system.

Figure 3:
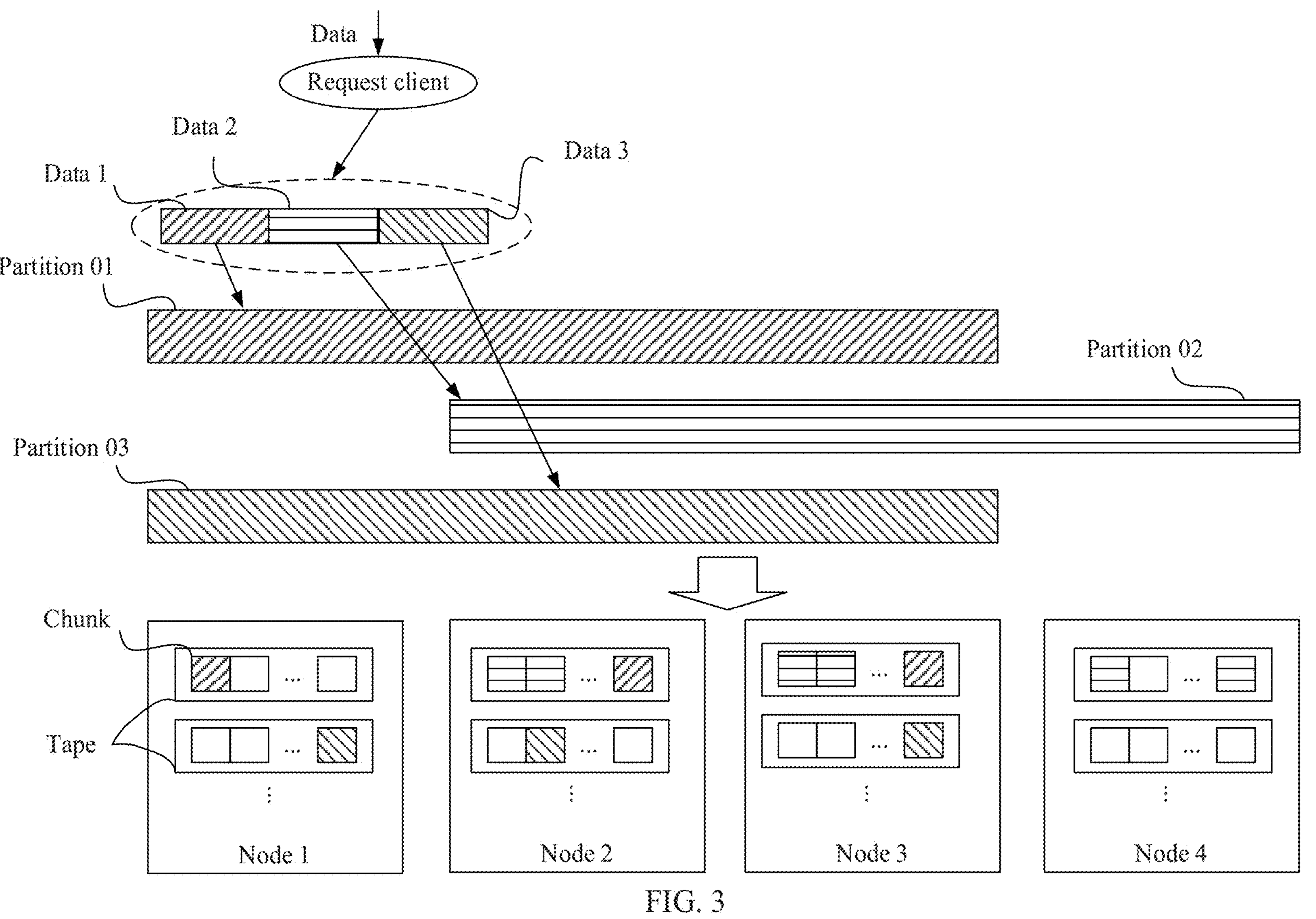
FIG. 3 is a diagram of an architecture of a distributed storage system.

FIG. 3 is a diagram of a distributed storage system.

Refer to FIG. 3. The distributed storage system may include a plurality of storage servers, which are also referred to as storage nodes and may be referred to as nodes for short. One storage server may include a plurality of tapes, one tape may be divided into a plurality of chunks, and each partition may be distributed on at least one storage node. Data from a request client may be usually stored in the at least one storage node using a multi-copy/erasure code redundancy policy.

In some designs, for example, a hash partitioning manner is used. Data from the request client is sliced (for example, represented as data 1, data 2, and data 3), and then data slices are scattered to different nodes in a hash manner, to obtain data stored in a plurality of data partitions, for example, a partition 01, a partition 02, and a partition 03. The plurality of data partitions may use a multi-copy/erasure code redundancy manner. For example, the partition 01 may be distributed and stored on a node 1, a node 2, and a node 3, the partition 02 may be distributed and stored on the node 2, the node 3, and a node 4, and the partition 03 may be distributed and stored on the node 1, the node 2, and the node 3. It should be understood that chunks in which the partition 01 is located are different from chunks in which the partition 03 is located, and chunks filled with different lines are used for differentiation in FIG. 3.

When distributed read/write access is performed based on the distributed storage architecture shown in FIG. 3, a plurality of nodes may need to be operated to read/write data according to different redundancy policies.

Figures 4, 5:
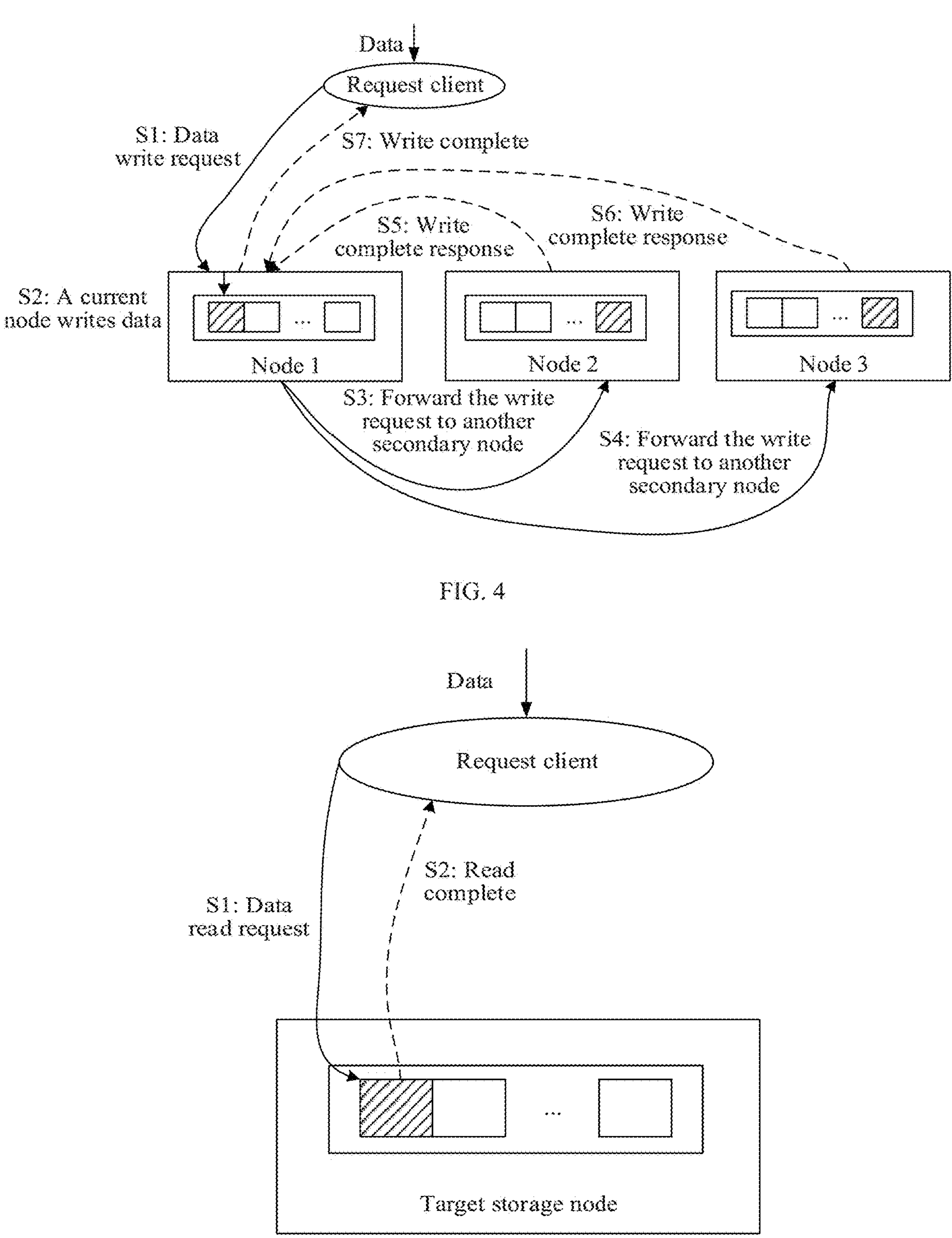
FIG. 4 is a schematic flowchart of writing data.
FIG. 5 is a schematic flowchart of reading data.

As shown in FIG. 4, an example in which data is written in an append write manner is used. When data is written in a data stream manner, in a write data stream working process, a group of tapes may need to be operated simultaneously on different nodes (where a quantity of tapes to be operated is less than or equal to a total quantity of nodes, for example, three-copy redundancy correspond to three tapes in a group). The following steps are included.

S1: A request client sends a data write request to a distributed storage node cluster. Correspondingly, the distributed storage node cluster receives the data write request.

S2: A node 1 writes data as a current node.

S3: The node 1 forwards the write request to another secondary node, for example, a node 2.

S4: The node 1 forwards the write request to another secondary node, for example, a node 3.

S5: After writing data as a current node, the node 2 sends a write complete response to the node 1.

S6: After writing data as a current node, the node 3 sends a write complete response to the node 1.

S7: The node 1 sends the write complete response to the request client.

As shown in FIG. 5, read access is used as an example, data is read only by accessing, through a tape drive, a tape in which corresponding data is located, and the following steps are included:

S1: A request client sends a data read request (which may be referred to as a read request for short) to a target storage node in a distributed storage node cluster. Correspondingly, the target storage node receives the data read request.

S2: The target storage node reads target data from a target chunk of a target tape, and feeds back the target data to the request client.

Generally, a quantity of tapes configured for a tape library is much greater than a quantity of tape drives. During concurrent access, the tape drive may need to switch a tape for serial access. In the manners shown in FIG. 3 to FIG. 5, a tape is divided at a fine granularity, and data is scattered for storage and access. Consequently, a read/write access conflict is easily caused.

Figure 6:
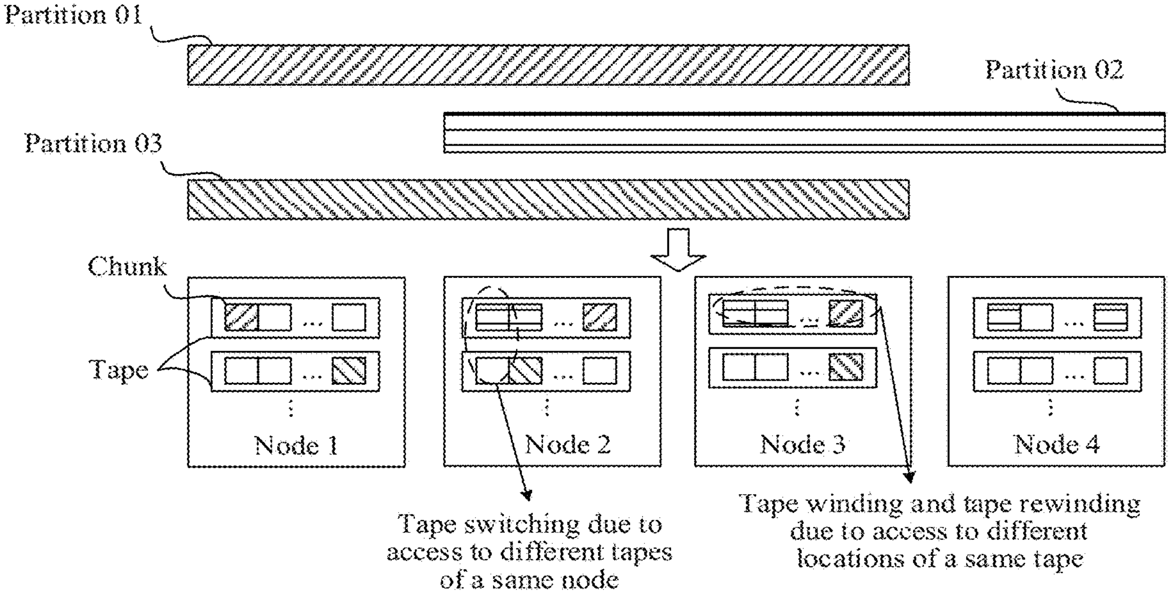
FIG. 6 is a diagram of a read/write conflict.

For example, as shown in FIG. 6, as shown in dashed ellipses, cross access to different locations of a same tape introduces frequent tape winding, and access to different tapes of a same node requires frequent tape switching. However, average time consumed for the tape switching and tape rewinding is at a minute level, and this seriously affects a throughput capability of a distributed storage system. Further, uneven wear of a tape drive may be caused, and a service life of the tape drive is shortened.

To resolve the foregoing problems, embodiments of this disclosure provide a data access method and system. At least one data access policy of a storage node, for example, a data space allocation policy, a tape drive wear leveling policy, and a scheduling policy, is introduced into a distributed tape storage system, to help reduce operations such as tape switching/tape winding, and prolong a service life of a tape drive. The method and apparatus are based on a same technical concept. Because problem-resolving principles of the method and apparatus are similar, mutual reference may be made to implementations of the apparatus and method, and repeated descriptions are not described.

Figure 7:
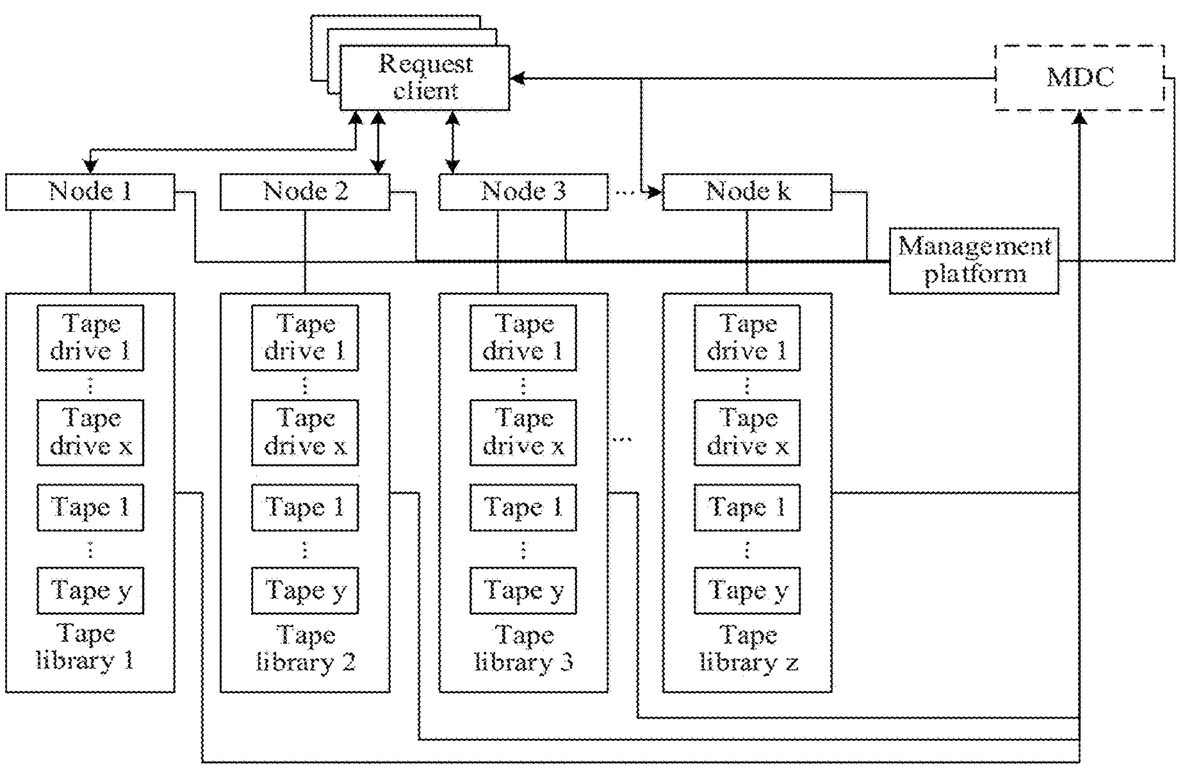
FIG. 7 is a diagram of an architecture of a distributed storage system to which an embodiment of this disclosure is applicable.

FIG. 7 is a diagram of an architecture of a storage system to which an embodiment of this disclosure is applicable.

As shown in FIG. 7, the system is a distributed tape storage system, and may include a management platform and a distributed storage node cluster. The distributed storage node cluster includes a plurality of storage servers (for example, represented as a node 1, a node 2, a node 3, . . . , and a node k, where k is an integer greater than or equal to 2).

The management platform may be externally connected, via the internet, to a terminal device operated by a user, and the user may manage, on the management platform, a distributed storage service provided by the distributed storage system. The management platform may be connected to the distributed storage node cluster in the system via an internal network, and the distributed storage node cluster may provide a storage service for service data from a request client. For example, the management platform may be used by a plurality of storage nodes in the distributed storage node cluster to perform function configuration, including but not limited to configuring a quantity of storage nodes, configuring a quantity of tape drives included in the storage node, and configuring at least one data access policy for each storage node.

Each storage node may be associated with at least one tape library, and each tape library may include x tape drives and y tapes, where x and y are integers greater than or equal to 1, z represents a total quantity of tape libraries, and z is an integer greater than or equal to 1. At least one request client (for example, an application program, which may be referred to as a client for short) may access the plurality of storage nodes via a data plane switch. The plurality of storage nodes may be connected to the at least one tape library through a bus (for example, an FC or an SAS). A tape library that is connected to each storage node and that serves as a storage backend may provide a data storage service and a data access service for the corresponding storage node and a request client.

It should be noted that, in embodiments of this disclosure, the quantity k of storage nodes, the total quantity z of tape libraries, the quantity x (where a value of the quantity x of tape drives of a different tape library may be different) of tape drives of each tape library, a quantity y of tapes, and the like included in the distributed storage system may be configured based on an application scenario, a service requirement, or the like. A specific implementation of a configuration process may be the same as or similar to a configuration manner of at least one data access policy in this application. The following provides detailed descriptions with reference to the accompanying drawings and embodiments. Details are not described herein.

During specific implementation, the request client may communicate with the distributed storage system, and apply for storage space from the distributed storage system when a client service has a requirement for data access to the distributed storage system. The distributed storage system may feed back storage space information to the request client, for example, notify the request client of details about the distributed storage node cluster, for example, a quantity of storage nodes included in the system, a quantity of tape drives, a used partitioning algorithm, and a specific partitioning situation. After the storage space is obtained through the application, when the request client may need to perform read/write access to the distributed storage system, the request client may determine, based on an actually running service and the details about the storage node cluster, how to allocate a partition to a data stream. For example, one partition corresponds to one write data stream. When receiving read/write access from the request client, each storage node that is of the distributed storage system and that serves as a target storage node may perform dynamic and balanced allocation on a tape, a tape drive, or a data stream according to at least one preconfigured data access policy, to improve hardware utilization and reduce impact on the client service.

In an optional implementation, the distributed storage system shown in FIG. 7 may further include a metadata cluster (MDC). The MDC may manage entire system space of the distributed storage node cluster, may partition the plurality of storage nodes in the distributed storage system based on preconfiguration information, when the request client applies for the storage space, may query available space for the request client, and may determine, based on a quantity of tape drives, a quantity of partitions that can be allocated to the request client together. It should be understood that, in embodiments of this disclosure, the MDC is merely an example for describing a module configured to perform a metadata management function, but does not constitute any limitation. In another embodiment, the function may be integrated into the request client, or the function may be implemented by a functional module with another name. Details are not described herein.

It should be noted that, in embodiments of this disclosure, the management platform and each storage node may be implemented by software, or may be implemented by hardware. For example, the following describes an implementation of the storage node. Similarly, for an implementation of the management platform, refer to the implementation of the storage node.

A module is used as an example of a software functional unit, and the storage node may include code run on a computing instance. The computing instance may be at least one of computing devices such as a physical host (computing device), a virtual machine, and a container. Further, there may be one or more computing devices. For example, the storage node may include code run on a plurality of hosts/virtual machines/containers. It should be noted that the plurality of hosts/virtual machines/containers for running an application may be distributed in a same region, or may be distributed in different regions. The plurality of hosts/virtual machines/containers used to run the code may be distributed in a same availability zone (AZ), or may be distributed in different AZs. Each AZ includes one data center or a plurality of data centers that are geographically close to each other. Generally, one region may include a plurality of AZs.

Similarly, the plurality of hosts/virtual machines/containers used to run the code may be distributed in a same virtual private cloud (VPC), or may be distributed in a plurality of VPCs. Generally, one VPC is disposed in one region. A communication gateway may need to be set in each VPC for communication between two VPCs in a same region or between VPCs in different regions. Interconnection between VPCs is implemented through the communication gateway.

A module is used as an example of a hardware functional unit, and the storage node may include at least one computing device such as a server. Alternatively, the storage node may be a device implemented using an application-specific integrated circuit (ASIC), a programmable logic device (PLD), or the like. The PLD may be a complex PLD (CPLD), a field-programmable gate array (FPGA), generic array logic (GAL), or any combination thereof.

A plurality of computing devices included in the storage node may be distributed in a same region, or may be distributed in different regions. The plurality of computing devices included in the storage node may be distributed in a same AZ, or may be distributed in different AZs. Similarly, the plurality of computing devices included in the storage node may be distributed in a same VPC, or may be distributed in a plurality of VPCs. The plurality of computing devices may be any combination of computing devices such as the server, the ASIC, the PLD, the CPLD, the FPGA, and the GAL.

It may be understood that FIG. 7 merely shows, as an example, functional modules that may be included in the distributed storage system, and does not limit functions and a quantity of the functional modules. This is not limited in this embodiment of this disclosure. A dashed-line box in the figure only indicates that a corresponding module is an optional independent module, and does not limit a product form of the module. In some embodiments, for example, an MDC may be integrated into the request client, or integrated into the management platform. This is not limited in this embodiment of this disclosure.

The following describes the management platform and any stored data access policy in embodiments of this disclosure with reference to the accompanying drawings and embodiments.

1. Management Platform

In embodiments of this disclosure, when a user configures a distributed storage service, the management platform may provide the user with an entry for configuring at least one data access policy, for example, an API for configuring the at least one data access policy, or a console interface for configuring the at least one data access policy. The user may complete customized configuration of the at least one data access policy through the entry, and the management platform may invoke an API provided by each storage node, to persistently store configuration information of the at least one data access policy on each storage node. When any storage node that serves as a target storage node receives an access request (read/write) from a request client, the storage node may process the received access request according to at least one preconfigured data access policy, to read and/or write a data stream.

In a specific implementation process, when configuring the distributed storage service on the management platform, the user may send a distributed storage service configuration request to the management platform via a terminal device operated by the user. The management platform may receive the distributed storage service configuration request from the terminal device, and feed back a distributed storage service configuration response to the terminal device in response to the configuration request. The distributed storage service configuration response may indicate candidate configuration information, and the user may determine target configuration information based on the candidate configuration information and a use requirement of the user for the distributed storage service. Further, the terminal device may send the target configuration information to the management platform, such that the management platform obtains, based on the target configuration information, the at least one data access policy configured by the user, to complete configuration. It may be understood that, in specific implementation, the target configuration information may be information representing the at least one data access policy, or the target configuration information may be information for obtaining the at least one data access policy, and a configuration implementation of the at least one data access policy is not limited in embodiments of this disclosure.

For example, configuration is performed through the console interface. The terminal device of the user may display the console interface. The console interface may provide an indicator attribute configuration item of each service. The user may input or select a corresponding parameter in a related attribute configuration item of the console interface based on the requirement of the user for the distributed storage service.

For example, the distributed storage service may include but is not limited to a storage node, space allocation, load balancing, data stream concurrency, a scheduling policy, and other services. After the user selects any one of the foregoing specific distributed storage services, the console interface may present a related indicator attribute configuration item of the service for the user to select or input, to complete related parameter configuration of the distributed storage service.

Figure 8:
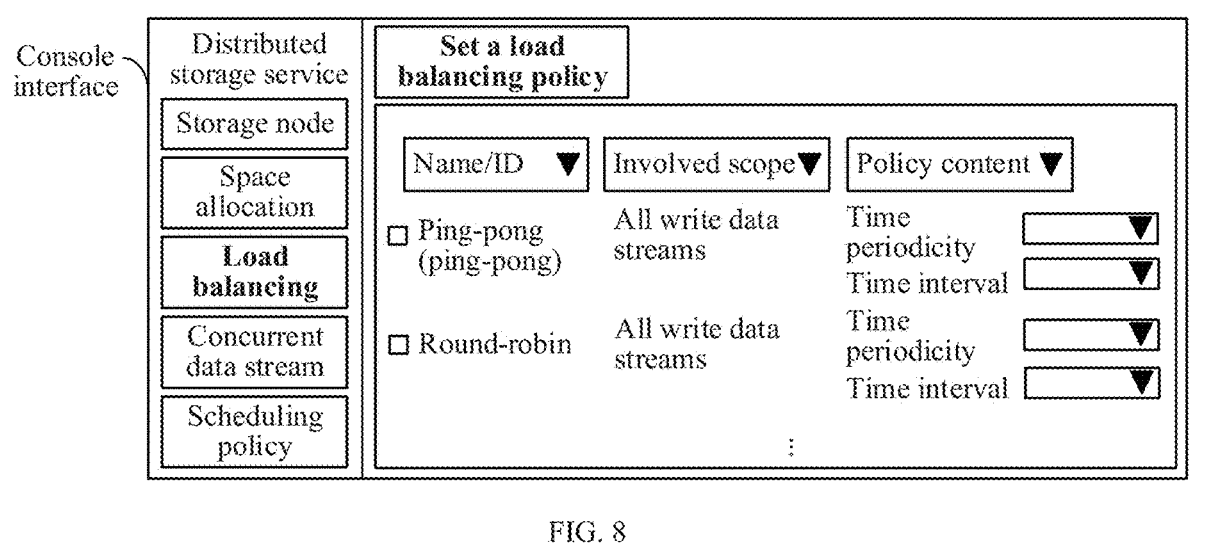

For example, a load balancing policy is configured. As shown in FIG. 8, an indicator attribute configuration item related to the load balancing policy may include a plurality of load balancing policies, for example, a ping-pong policy and a round-robin policy. Each load balancing policy may be associated with a name (or an identifier (ID)), an involved scope, and specific policy content, for example, a time periodicity and a time interval. The time periodicity is an implementation periodicity of the load balancing policy, and may be 24 hours, one week, one month, or the like. The time interval is a time interval obtained by dividing the time periodicity, and may be equally divided or unequally divided. This is not limited in embodiments of this disclosure. The user may select a target load balancing policy from the plurality of load balancing policies based on a use requirement of the user for the distributed storage system. The target load balancing policy can be for balancing operating duration of at least one tape drive of each storage node, such that each tape drive does not operate continuously for a long time, to prolong a service life of the tape drive.

Figure 9:
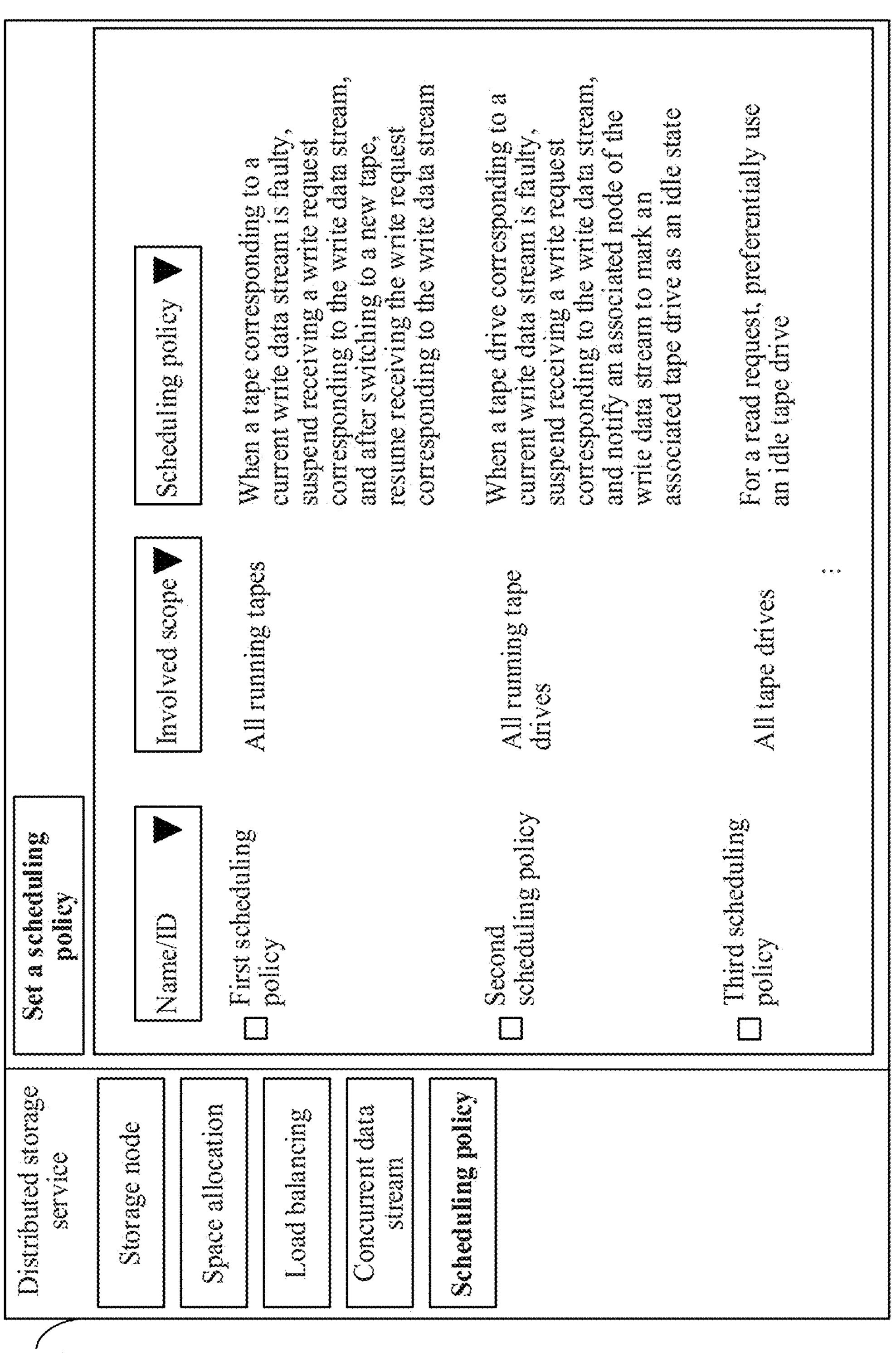
FIG. 9 is a diagram of a console interface according to an embodiment of this disclosure.

For example, a scheduling policy is configured. As shown in FIG. 9, an indicator attribute configuration item related to the scheduling policy may include a plurality of scheduling policies, and each scheduling policy may be associated with a name (or an ID), an involved scope, specific scheduling policy content, and the like. The user may select a target scheduling policy from the plurality of scheduling policies based on a dynamic scheduling requirement of the user for the distributed storage service. The target scheduling policy can satisfy the dynamic scheduling requirement of the user for the distributed storage service.

For example, an involved scheduling policy that may be selected by the user is a first scheduling policy, where an involved scope of the first scheduling policy is all running tapes of a storage node, and content of the first scheduling policy includes: when a tape corresponding to a current write data stream is faulty, suspending receiving a write request corresponding to the write data stream; and after switching to a new second tape, resuming receiving the write request corresponding to the write data stream.

For another example, an involved scheduling policy that may be selected by the user is a second scheduling policy, where an involved scope of the second scheduling policy is all running tape drives of a storage node, and content of the second scheduling policy includes: when a tape drive corresponding to a current write data stream is faulty, suspending receiving a write request corresponding to the write data stream, and notifying an associated node of the write data stream to mark an associated tape drive as an idle state. The associated node is a storage node configured to perform redundancy backup on the write data stream, and the associated tape drive is a tape drive that is configured to perform a write operation and that is in the associated node.

For another example, an involved scheduling policy that may be selected by the user includes a third scheduling policy, where an involved scope of the third scheduling policy is all tape drives of a storage node, and content of the third scheduling policy includes: for a read request, preferentially using an idle tape drive that is not occupied.

It should be understood that this is merely an example description of a scheduling policy preconfigured for a case such as a read/write conflict or a hardware fault in embodiments of this disclosure, and does not constitute any limitation. In another embodiment, the console interface may alternatively provide another scheduling policy for the user, for example, a fourth scheduling policy, where an involved scope is all running tapes of a storage node, and content of the fourth scheduling policy includes: when a tape corresponding to a current write data stream may need to be read, suspending receiving a write request corresponding to the data stream; after received data of the current write data stream is written, executing a read request using a same tape drive; and after the read request is executed, resuming receiving the write request corresponding to the write data stream. Alternatively, a fifth scheduling policy may be provided, where an involved scope is all tape drives and all tapes of a storage node, and content of the fifth scheduling policy includes: when a tape that may need to be read and accessed is not in a currently running tape drive, and there is no idle tape drive, selecting a write data stream, and suspending receiving a write request corresponding to the selected write data stream; after received data of the selected write data stream is written, executing a read request using a same tape drive; and after the read request is executed, resuming the write request corresponding to the selected write data stream. In actual application, the scheduling policy may be configured or adjusted as required, and details are not described herein.

In addition, in embodiments of this disclosure, the management platform may further provide an API for the user to perform configuration. For example, the management platform may display, on a web page provided by the internet, an API format used for configuration, and indicate usage of a plurality of fields of different attributes. After viewing the API format, the user inputs a corresponding parameter based on the API format. The user may send, on the internet to the management platform in a template manner, an API with the input parameter. The management platform detects parameters corresponding to different fields in the API, to obtain requirements that are of the user and that correspond to the different fields of the API. Therefore, in embodiments, the at least one data access policy received by the management platform may include an API field and a parameter input by the user. Further, the management platform may store related information of the at least one data access policy in a storage unit of each storage node.

It should be noted that the foregoing example is merely an example for describing a configuration process of the at least one data access policy in embodiments of this disclosure, and does not limit a specific implementation in which the user customizes the at least one data access policy. In another embodiment, the at least one data access policy may alternatively be implemented in another manner. Details are not described herein.

It should be understood that the at least one data access policy in embodiments of this disclosure may be configured in a running program of a related node in a manner of program code. Alternatively, the at least one data access policy may be customized and input by the user based on an API format provided by the distributed storage system. Alternatively, the at least one data access policy may be an attribute configuration item provided on a console management interface provided by the distributed storage system, and is input or selected by the user in a customized manner. A configuration manner of the at least one data access policy is not limited in embodiments of this disclosure.

2. Distributed Storage Node Cluster

To reduce operations such as tape switching/tape winding, and prolong a service life of a tape drive, any storage node in the distributed storage system shown in FIG. 7 may be configured to process a read/write request from a request client using at least one data access policy (where for a configuration process, refer to related descriptions of a management platform, and details are not described herein again).

For example, the at least one data access policy may include the following policies.

(1) Storage Resource Separation Policy

Resource separation is performed on different data streams from the request client, such that the different data streams are distributed on different tapes. When a plurality of data streams is concurrent, performance of all tape drives can be brought into play.

(2) Data Space Allocation Policy

A maximum quantity of concurrent data streams in a node is equal to a quantity of tape drives in a tape library associated with the node. Tape space is divided as a whole, and is not split and scattered. For a same write data stream, current tape space is fully written first and then other tape space is allocated to the write data stream.

i represents a quantity of write data streams from a request client, j represents a quantity of read data streams from the request client, $i \leq \min(x)$, and a total quantity of data streams is $i+j \leq x$. A ratio of i/j may be a default value in a system, or may be customized by a user. This is not limited in embodiments of this application.

Figure 10:
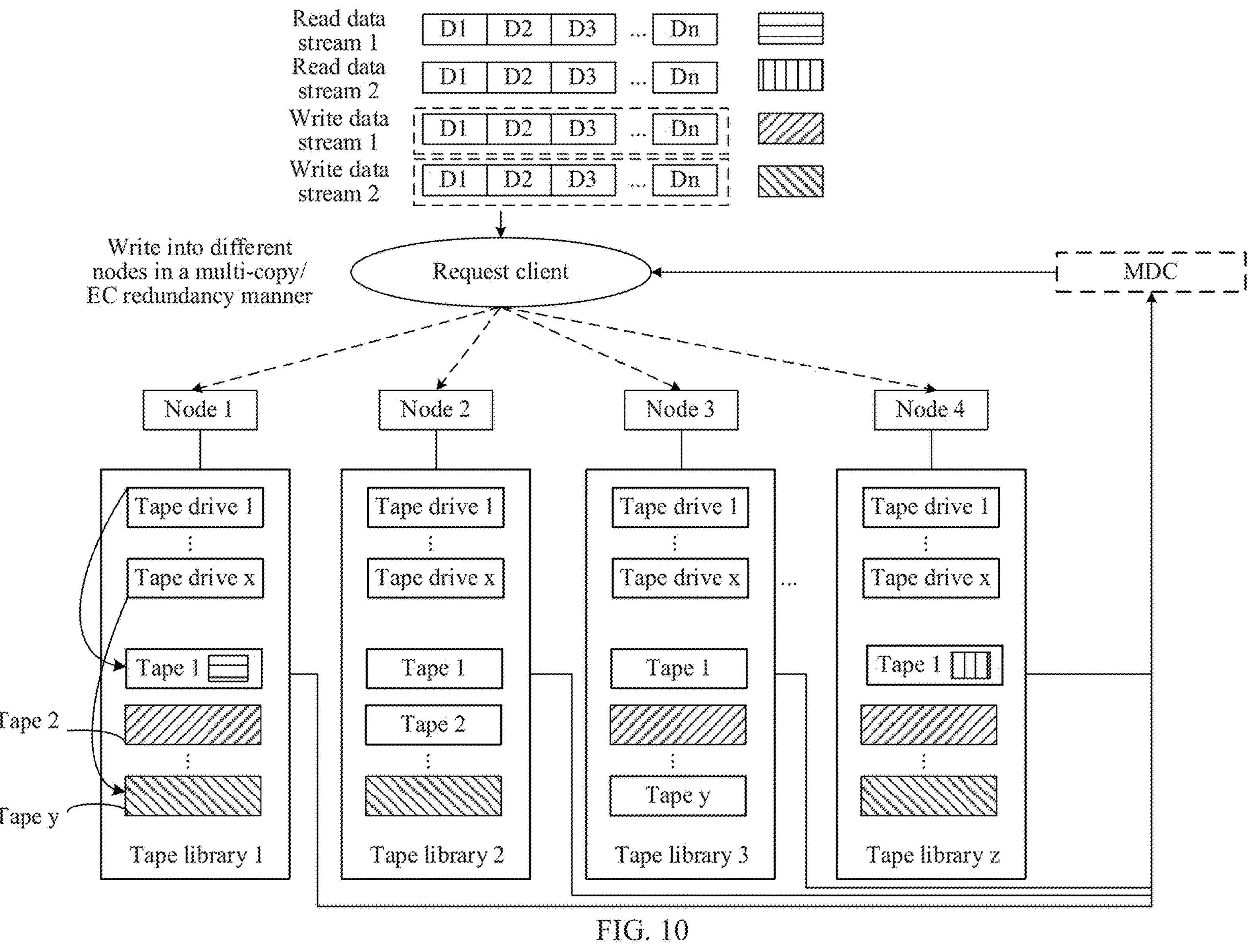
FIG. 10 is a diagram of a data space allocation policy according to an embodiment of this disclosure.

As shown in FIG. 10, different filling patterns represent different data streams from the request client. The request client may slice the data streams, and perform redundancy backup in a multi-copy/erasure code manner.

For a read data stream 1, after the request client sends a read request to a distributed storage system, a target storage node (for example, a node 1) queries target data in a target chunk of a tape 1 via, for example, a tape drive 1, and feeds back the target data to the request client. For a read data stream 2, after the request client sends a read request to the distributed storage system, a target storage node (for example, a node 4) queries target data in a chunk of a tape 1 via, for example, a tape drive 1, and feeds back the target data to the request client.

For a write data stream 1, the request client sends a write request to the distributed storage system after slicing the data stream, target storage nodes (for example, the node 1, a node 3, and the node 4) allocate tape space to the write data stream 1 at a tape granularity, for example, a tape 2 of the node 1, a tape 2 of the node 3, and a tape 2 of the node 4, and data is written into tape space of the tape 2 via tape drives 1. After the current tape space is written fully, other tape space is allocated to the write data stream 1. For a write data stream 2, the request client sends a write request to the distributed storage system after slicing the data stream, target storage nodes (for example, the node 1, a node 2, and the node 4) allocate tape space to the write data stream 2 at a tape granularity (for example, a tape y of the node 1, a tape y of the node 2, and a tape y of the node 4), and data may be written into tape space of the tape y via tape drives x. After the current tape space is written fully, other tape space is allocated to the write data stream 2.

It should be understood that FIG. 10 merely schematically describes the data space allocation policy in embodiments of this application, and does not limit an allocation manner of a target storage node, a target tape drive, or a target tape corresponding to a data stream. Details are not described herein.

(3) Tape Drive Wear Leveling Policy

Load balancing is performed for different written data streams, such that each tape drive does not operate continuously for a long time, to prolong a service life of the tape drive through wear leveling of the tape drive.

For example, the distributed storage system may use any one of a plurality of configurable load balancing policies such as a ping-pong policy and a round-robin policy as the tape drive wear leveling policy. A time periodicity corresponding to any load balancing policy may be configured as required, and may be 24 hours, one week, one month, or the like. This is not limited in embodiments of this application.

Figures 11, 12:
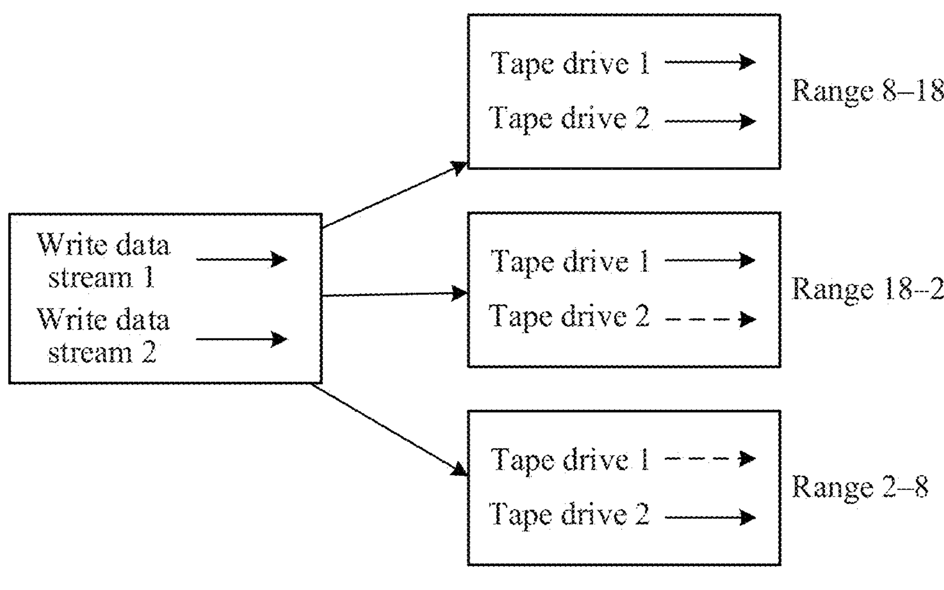
FIG. 11 is a diagram of a ping-pong load balancing policy according to an embodiment of this disclosure.
FIG. 12 is a diagram of a round-robin load balancing policy according to an embodiment of this disclosure.

24 hours are used as an example. As shown in FIG. 11, when the ping-pong policy is used, in an example, the 24 hours may be divided into at least one time range, for example, three time ranges: a range 8-18, a range 18-2, and a range 2-8. When a quantity of tape drives of a tape library is 2, the two tape drives may be configured to: perform, in the range 8-18, a write operation on at least two write data streams (which are represented by solid arrows) from a request client using both the tape drives of the tape library; and perform, in the range 18-2 or the range 2-8, a write operation on a write data stream from the request client using one of the tape drives, where a dashed arrow indicates a tape drive that does not perform a write operation. Therefore, load balancing is performed on a tape drive, such that different tape drives can rest in different time ranges, and do not operate for a long time. This helps reduce wear of the tape drives and prolong service lives of the tape drives.

24 hours are still used as an example. As shown in FIG. 12, when the round-robin policy is used, in an example, 24 hours may be divided into at least one time range, for example, three time ranges: a range 0-8, a range 8-16, and a range 16-24. When a quantity of the tape drives is 3, the three tape drives may be configured to perform, in a round-robin manner, a write operation on at least two write data streams (which are represented by solid line arrows) from the request client using different tape drives in different time ranges. For example, a tape drive 2 and a tape drive 3 are used in the range 0-8, a tape drive 1 and the tape drive 3 are used in the range 8-16, and the tape drive 1 and the tape drive 2 are used in the range 16-24. Therefore, load balancing is performed on a tape drive, such that different tape drives can rest in different time ranges, and do not operate for a long time. This helps reduce wear of the tape drives and prolong service lives of the tape drives.

It should be noted that the foregoing is merely an example description of a load balancing policy that can be used by a tape drive in embodiments of this application, and does not constitute any limitation. In an actual application, none of a quantity of tape drives of a tape library, a time periodicity corresponding to a load balancing policy of the tape drive of the tape library, and a division manner of the time periodicity is limited. Details are not described herein.

(4) Data Stream Scheduling Policy

A read/write ratio may be configured based on a quantity of tape drives. A scheduling policy of a data stream is configured, such that an access request can be dynamically switched when a backend tape conflict or fault is sensed.

For example, the configured scheduling policy of the data stream may be described as follows:

Case 1: First Scheduling Policy

When a tape corresponding to a current write data stream is faulty, the current write data stream does not receive a new request. Then, space is reallocated to the write data stream, and the tape is switched as a whole. After switching is complete, the corresponding write data stream resumes receiving a new write request.

Case 2: Second Scheduling Policy

When a tape drive corresponding to a current write data stream is faulty, the current write data stream does not receive a new request. A tape drive of another node corresponding to the data stream is marked as idle.

Case 3: Third Scheduling Policy

When a current target storage node may need to read a tape, when there is an idle tape drive in a tape library associated with the target storage node, the tape can be loaded and directly accessed.

Case 4: Fourth Scheduling Policy

When a tape that is writing a write data stream may need to be read, the current write data stream does not receive a new request service. After a write request in the current data stream is completed, a read request is executed. After the read request is completed, the write data stream resumes receiving a new write request.

Case 5: Fifth Scheduling Policy

When a tape that may need to be read is not in a current tape drive and the current tape drive is not idle, a current data stream does not receive a new request. After a write request in the current data stream is completed, a read request is executed, and the tape drive switches a tape to the tape on which data is to be read. After the read request is executed, the tape is switched again, and the write data stream resumes receiving a new write request.

Figure 13:
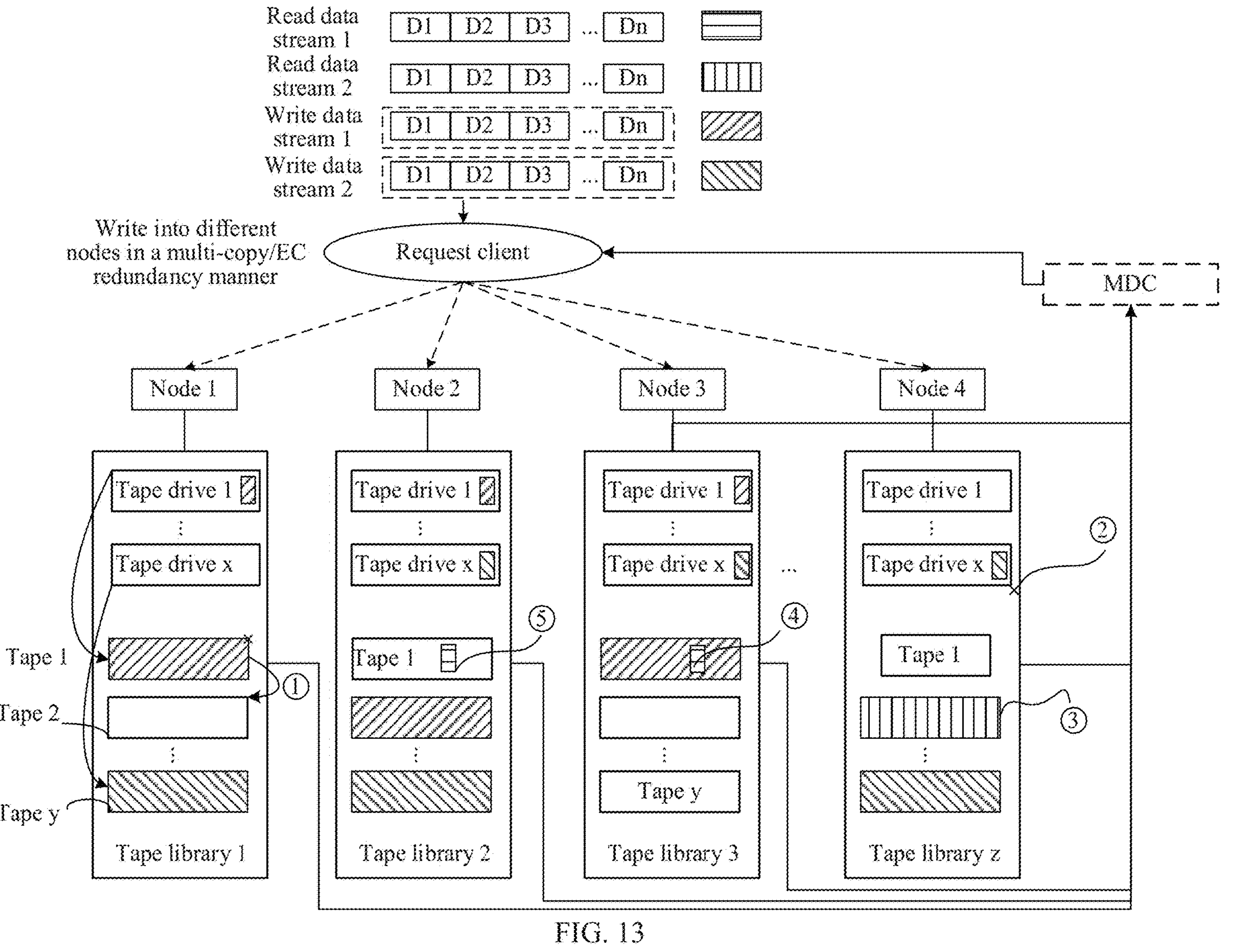
FIG. 13 is a diagram of a scheduling policy according to an embodiment of this disclosure.

The following explains and describes the data stream scheduling policy described in Case 1 to Case 5 with reference to FIG. 13.

As shown in FIG. 13, different filling patterns represent different data streams from a request client, tapes or chunks occupied by the data stream use a same filling pattern, and an idle tape drive or an idle tape has no filling. The request client may slice the data streams, and perform redundancy backup in a multi-copy/erasure code manner.

For execution of the data stream scheduling policy in Case 1:

As shown in ① in FIG. 13, when a tape drive 1 of a node 1 writes a write data stream 1 into a tape 1 and the tape 1 is faulty, the write data stream 1 is scheduled to no longer receive a new request service. The node 1 may reallocate tape space to the write data stream 1, and switch the tape as a whole, for example, switch from the tape 1 to a tape 2. After tape switching is completed, the write data stream 1 resumes receiving a new write request, and the tape drive 1 writes data of the write data stream 1 into the tape 2.

For execution of the data stream scheduling policy of a Case 2:

As shown in ② in FIG. 13, when a tape drive x of a node 4 writes data of a write data stream 2 into a tape y and the tape drive x is faulty, the write data stream 2 is scheduled to no longer receive a new write request, and tape drives x of other nodes (for example, a node 2 and a node 3) corresponding to the write data stream 2 are scheduled to be marked as idle. The faulty tape drive or the tape drives marked as idle do not perform write operations until the tape drive is repaired to a normal state.

For execution of the data stream scheduling policy in Case 3:

As shown in ③ in FIG. 13, when a read request 2 from the request client may need reading of data from a tape 2 of a node 4, when there is an idle tape drive, for example, a tape drive 1, on the node 4, the node 4 may directly load the tape 2 to the idle tape drive 1 and directly access the tape 2 to read target data.

For execution of the data stream scheduling policy in Case 4:

As shown in ④ in FIG. 13, when a write data stream 1 from the request client is allocated to a tape 1 of a node 1, a tape 2 of a node 2, and a tape 1 of a node 3 for storage, and a tape drive 1 of each node writes data of the write data stream 1 into a corresponding tape, when the node 3 receives a read request 1 for the tape 1 from the request client, the write data stream 1 is scheduled to no longer receive a new request service, the read request 1 is scheduled to be executed after the current data stream 1 is written, and target data is read from the tape 1 of the node 3. After the read request 1 is executed, the write data stream 1 resumes receiving a new write request.

For execution of the data stream scheduling policy in Case 5:

As shown in ⑤ in FIG. 13, when the read request 1 from the request client may need reading of data from a tape 1 of a node 2, when the tape 1 is not running in current tape drives and the current tape drives are not idle, for example, the tape drive 1 is occupied by a tape 2 to write a write data stream 1, and a tape drive x is occupied by a tape y to write a write data stream 2, a write data stream selected (which may be randomly selected or selected according to a pre-configured selection policy, which is not limited) from the write data stream 1 and the write data stream 2 is scheduled to no longer receive a new request service, and a read request 2 is scheduled to be executed by switching a tape. Assuming that the write data stream 1 is selected, after the current write data stream 1 is written, the tape drive 1 executes the read request 2, switches the tape 2 to the tape 1, and reads target data from the tape 1. After the read request 2 is executed, the tape drive 1 switches the tape again, switches the tape 1 to the tape 2, and the write data stream 1 resumes receiving a new write request.

Therefore, according to the data stream scheduling policies shown in the foregoing Case 1 to Case 5, a distributed storage node can sense problems such as a conflict and a fault of a backend tape/tape drive, and perform scheduling using a corresponding data stream scheduling policy when different problems occur, to improve hardware utilization, and reduce impact on a service on a request client side.

It should be noted that the foregoing Case 1 to Case 5 are merely examples for describing the data stream scheduling policy in embodiments of this application, but do not constitute any limitation. In actual application, a data stream scheduling policy may be added or a data stream scheduling policy may be modified based on a new case. This is not limited in embodiments of this application.

So far, the management platform, the distributed storage node cluster, and functions of the management platform and the distributed storage node cluster in embodiments of this application are described with reference to the accompanying drawings and embodiments. The management platform may provide a customized channel of at least one data access policy expected by a user, such that the user customizes and configures a function for the distributed storage node cluster. Each storage node in the distributed storage node cluster processes a read/write access request from a request client according to a policy customized by the user, to reduce operations such as tape switching/tape winding, improve system efficiency, prolong a service life of a tape drive, and ensure service running on a request client side.

It should be noted that, in the foregoing embodiments of this application, the management platform and the distributed storage service are merely used as examples for description, but do not constitute any limitation. In another embodiment, the management platform and the distributed storage node cluster may be further configured to implement another processing function on service data, including but not limited to access, processing, aggregation, and the like. Processed service data may be written into the distributed storage node cluster. Details are not described herein.

An embodiment of this application further provides a data access method.

Figure 14:
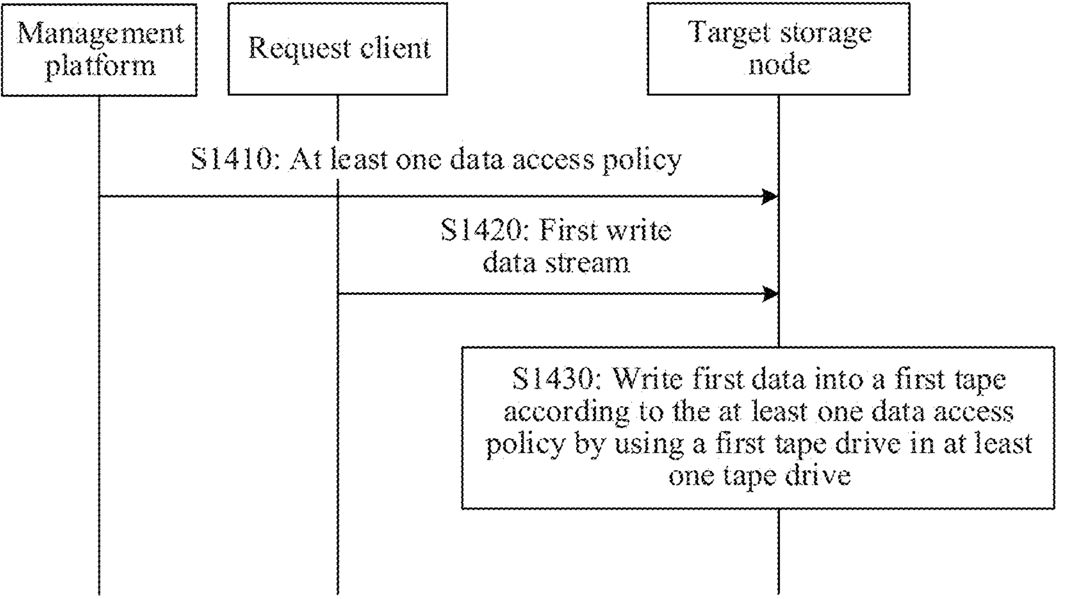
FIG. 14 is a schematic flowchart of a data access method according to an embodiment of this disclosure.

FIG. 14 is a schematic flowchart of a data access method according to an embodiment of this application. The method may be implemented by a management platform, a request client, and a target storage node in the distributed storage node cluster shown in FIG. 7. As shown in FIG. 14, the data access method may include the following steps.

S1410: The target storage node determines at least one data access policy input or selected by a user on the management platform.

In embodiments of this application, the at least one data access policy may be obtained through customized configuration of the user, and indicates an access management requirement of the user for a storage node. Configuration information of the at least one data access policy may be persistently stored in each storage node in the distributed storage node cluster. When S1410 is implemented, the target storage node may obtain the configuration information of the at least one data access policy by automatically running a program or from a local storage unit. An obtaining manner is not limited in embodiments of this application. For configuration details, refer to the foregoing related descriptions with reference to the management platform. Details are not described herein again.

S1420: The target storage node receives a first write data stream from the request client.

In embodiments of this application, "first" is for distinguishing between different write data streams received by the target storage node.

Generally, when having a requirement for access to the distributed storage node cluster, the request client communicates with the distributed storage node cluster, to apply for storage space. Further, the request client generates service data based on a running service requirement, and the service data may need to be stored in the distributed storage node cluster. The request client may generate the first write data stream, where the first write data stream indicates a first tape, first data to be written into the first tape, and first tape space required by the first data, the first tape space belongs to a same data partition, and the data partition is distributed on at least one storage node in the storage node cluster to which the target storage node belongs.

S1430: The target storage node writes the first data into the first tape according to the at least one data access policy using a first tape drive in at least one tape drive.

In an optional implementation, the at least one data access policy may include a data space allocation policy or a resource separation policy for the foregoing data. Based on the foregoing related descriptions, a write data stream from the request client is partitioned according to a preset data space allocation policy or resource separation policy. Therefore, on a target storage node side, a concurrency quantity of received different write data streams is less than or equal to a first value, where the first value is a minimum value of quantities of tape drives of a plurality of storage nodes included in the distributed storage node cluster, for example, expressed as min(x). Concurrent access of a plurality of data streams helps bring performance of a tape drive into play.

In another optional implementation, the at least one data access policy includes either of the following load balancing policies: a ping-pong policy or a round-robin policy, and the load balancing policy is for performing load balancing on different write data streams received by the target storage node. In this way, different tape drives of the target storage node can rest in turn, and do not operate continuously for a long time. This helps prolong a service life of the tape drive.

The at least one data access policy may further include the scheduling policy described above. When S1430 is implemented, the target storage node may perform dynamic scheduling according to a corresponding scheduling policy in different cases such as a read/write conflict and a hardware fault, to ensure normal running of a service on a request client side.

For example, the at least one data access policy may include a first scheduling policy. When S1430 is implemented, and the first tape is faulty, the target storage node suspends, according to the first scheduling policy, receiving a write request corresponding to the first write data stream; and after the first tape is switched to a new second tape, the target storage node resumes receiving the write request corresponding to the first write data stream, and writes the first data of the first write data stream into the second tape.

For another example, redundancy backup is performed on the first write data stream using either of the following redundancy policies: multi-copy or erasure code, and the at least one data access policy includes a second scheduling policy. When S1430 is implemented, and the first tape drive is faulty, the target storage node suspends, according to the second scheduling policy, receiving a write request corresponding to the first write data stream; and the target storage node notifies an associated storage node to mark an associated tape drive of the first write data stream as an idle state, where the associated storage node is a storage node that is in the storage node cluster and that is configured to perform redundancy backup on the first write data stream, and the associated tape drive is a first tape drive of the associated storage node.

For another example, the target storage node may further receive a read request, where the read request indicates a third tape and an on-tape offset address in which to-be-read second data is located. The target storage node reads the second data from the first tape using a third tape drive in the at least one tape drive and based on the on-tape offset address indicated by the read request.

In an implementation, the at least one data access policy includes a third scheduling policy, and the third scheduling policy indicates that the third tape drive is an idle tape drive of the target storage node.

In another implementation, the at least one data access policy includes a fourth scheduling policy. When S1430 is implemented, and the third tape is the same as the first tape, the target storage node suspends, according to the fourth scheduling policy, receiving the write request corresponding to the first write data stream; after the received first data of the first write data stream is written, the target storage node executes the read request using the third tape drive, to read the second data from the first tape, where the third tape drive is the same as the first tape drive; and after the read request is executed, the target storage node resumes receiving the write request corresponding to the first write data stream.

In another implementation, the at least one data access policy includes a fifth scheduling policy, when S1430 is implemented, and the third tape is different from the first tape and there is no idle tape drive in the at least one tape drive, the target storage node selects, according to the fifth scheduling policy, a tape drive corresponding to a second write data stream as the third tape drive, where the second write data stream belongs to at least one concurrent write data stream of the target storage node, and the second write data stream is the same as or different from the first write data stream; the target storage node suspends receiving a write request corresponding to the second write data stream; after the received second data of the second write data stream is written, the target storage node executes the read request using the third tape drive; and after the read request is executed, the target storage node resumes receiving the write request corresponding to the first write data stream.

For implementation details, refer to the foregoing related descriptions with reference to FIG. 7 to FIG. 13. Details are not described herein again.

Figure 15:
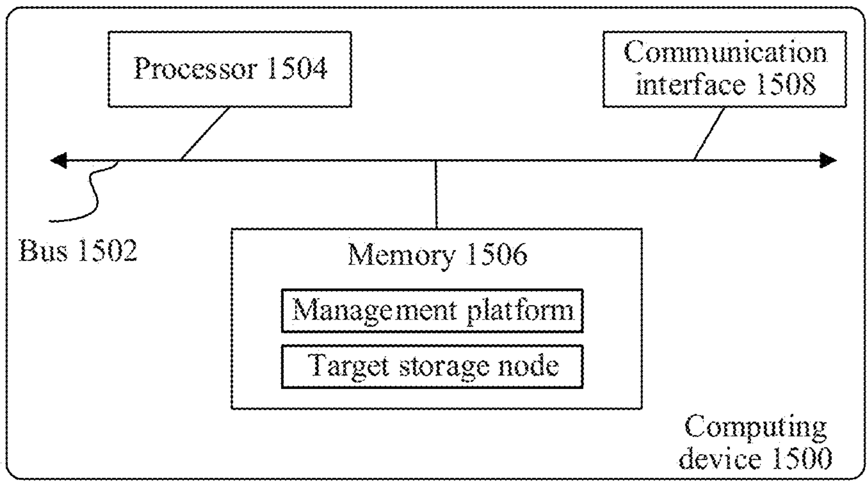
FIG. 15 is a diagram of a computing device according to an embodiment of this disclosure.

This application further provides a computing device. As shown in FIG. 15, a computing device 1500 includes a bus 1502, a processor 1504, a memory 1506, and a communication interface 1508. The processor 1504, the memory 1506, and the communication interface 1508 communicate with each other through the bus 1502. The computing device 1500 may be a server or a terminal device. It should be understood that a quantity of processors and a quantity of memories in the computing device 1500 are not limited in this application.

The bus 1502 may be a Peripheral Component Interconnect (PCI) bus, an Extended Industry Standard Architecture (EISA) bus, or the like. Buses may be classified into an address bus, a data bus, a control bus, and the like. To facilitate illustration, only one line is used in FIG. 15 to represent the bus, but it does not indicate that there is only one bus or only one type of bus. The bus 1502 may include a path for transmitting information between components (for example, the memory 1506, the processor 1504, and the communication interface 1508) of the computing device 1500.

The processor 1504 may include any one or more of processors such as a central processing unit (CPU), a graphics processing unit (GPU), a microprocessor (MP), or a digital signal processor (DSP).

The memory 1506 may include a volatile memory, for example, a random-access memory (RAM). The processor 1504 may further include a non-volatile memory, for example, a read-only memory (ROM), a flash memory, a hard disk drive (HDD), or a solid-state drive (SSD).

The memory 1506 stores executable program code, and the processor 1504 executes the executable program code to separately implement functions of apparatuses included in the foregoing data access system or implement functions of apparatuses included in the foregoing distributed storage system, to implement the data access method in embodiments of this application. In other words, the memory 1506 stores instructions for performing the data access method.

The communication interface 1508 implements communication between the computing device 1500 and another device or a communication network using a transceiver module, for example, but not limited to a network interface card or a transceiver.

An embodiment of this application further provides a computing device cluster. The computing device cluster includes at least one computing device. The computing device may be a server, for example, a central server, an edge server, or a local server in a local data center. In some embodiments, the computing device may alternatively be a terminal device, for example, a desktop computer, a notebook computer, or a smartphone.

Figure 16:
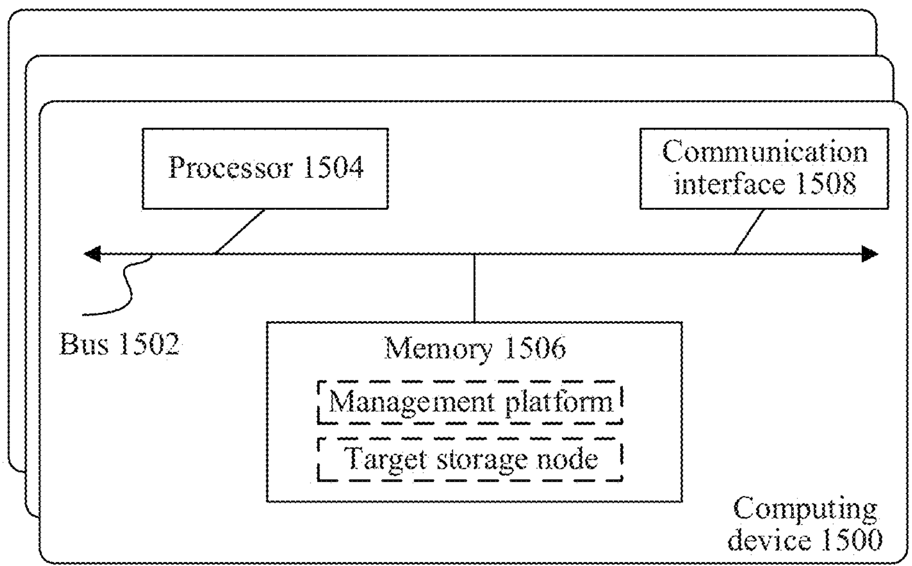
FIG. 16 and FIG. 17 are diagrams of computing device clusters according to embodiments of this disclosure.

As shown in FIG. 16, the computing device cluster includes at least one computing device 1500. Memories 1506 in one or more computing devices 1500 in the computing device cluster may store same instructions for performing a data access method.

In some possible implementations, the memories 1506 in the one or more computing devices 1500 in the computing device cluster may alternatively separately store some instructions for performing the data access method. In other words, a combination of the one or more computing devices 1500 may jointly execute the instructions for performing the data access method.

It should be noted that memories 1506 in different computing devices 1500 in the computing device cluster may store different instructions, for performing some functions of a management platform or a target storage node. In other words, the instructions stored in the memories 1506 in the different computing devices 1500 may implement functions of one or more modules in the management platform or the target storage node described above.

Figure 17:
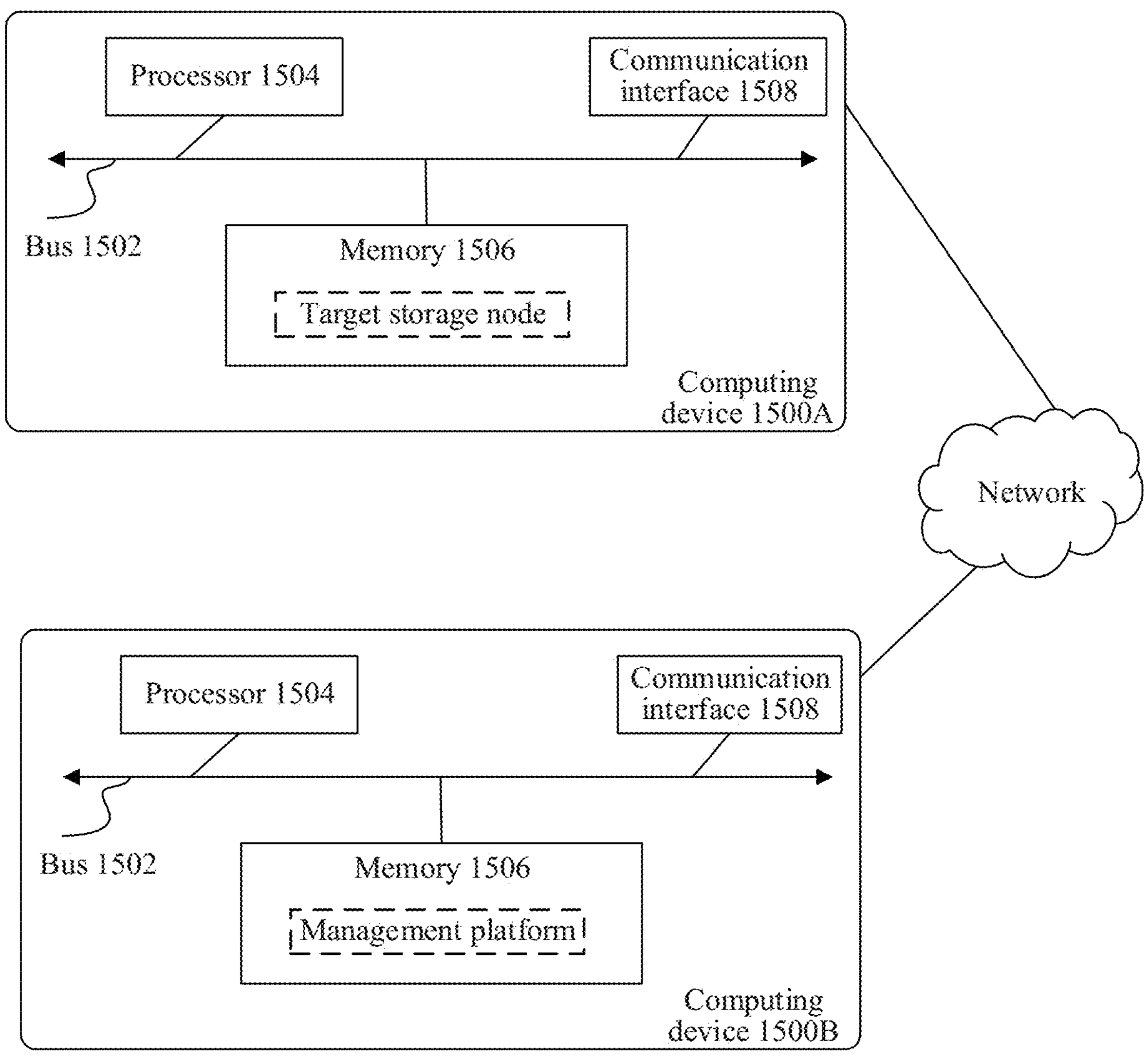

In some possible implementations, the one or more computing devices in the computing device cluster may be connected through a network. The network may be a wide area network, a local area network, or the like. FIG. 17 shows a possible implementation. As shown in FIG. 17, two computing devices 1500A and 1500B are connected through a network. Each computing device is connected to the network through a communication interface of the computing device. In this possible implementation, a memory 1506 in the computing device 1500A stores instructions for performing functions of a target storage node. In addition, the memory 1506 in the computing device 1500B stores instructions for performing the functions of the target storage node.

A connection manner between computing devices shown in FIG. 17 may be that, considering that the data access method provided in this application requires a plurality of computing devices, for example, a large amount of data storage and analysis and calculation, it is considered that the functions of the target storage node is performed by the computing device 1500A.

It should be understood that functions of the computing device 1500A shown in FIG. 17 may alternatively be completed by a plurality of computing devices 1500. Similarly, functions of the computing device 1500B may alternatively be completed by a plurality of computing devices 1500.

It should be noted that memories 1506 in different computing devices 1500 in the computing device cluster may store different instructions for performing some functions of a distributed storage system. In other words, the instructions stored in the memories 1506 in the different computing devices 1500 may implement functions of one or more apparatuses in the distributed storage system.

An embodiment of this application further provides a computer program product including instructions. The computer program product may be software or a program product that includes instructions and that can run on a computing device or be stored in any usable medium. When the computer program product runs on at least one computing device, the at least one computing device is caused to perform a data access method.

An embodiment of this application further provides a computer-readable storage medium. The computer-readable storage medium may be any usable medium that can be stored by a computing device, or a data storage device, such as a data center, including one or more usable media. The usable medium may be a magnetic medium (for example, a floppy disk, a hard disk drive, or a magnetic tape), an optical medium (for example, a digital versatile disc (DVD)), a semiconductor medium (for example, an SSD), or the like. The computer-readable storage medium includes instructions. The instructions instruct a computing device to perform the data access method.

Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a compact-disc read-only memory (CD-ROM), an optical memory, and the like) that include computer-usable program code.

These computer program instructions may be stored in a computer-readable memory that can instruct a computer or any other programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, such that a series of operations and steps are performed on the computer or the other programmable device, such that computer-implemented processing is generated. Therefore, the instructions executed on the computer or the other programmable device provide steps for implementing a specific function in one or more procedures in the flowcharts and/or in one or more blocks in the block diagrams.

It is clear that a person skilled in the art can make various modifications and variations to embodiments of this application without departing from the scope of embodiments of this application. In this case, this application is intended to cover these modifications and variations of embodiments of this application provided that they fall within the scope of protection defined by the following claims and their equivalent technologies. In embodiments of this application, unless otherwise stated or there is a logic conflict, terms and/or descriptions between embodiments are consistent and may be mutually referenced, and technical features in different embodiments may be combined into a new embodiment based on an internal logical relationship thereof.

The invention claimed is:

1. A method comprising:

determining, by a target storage node, at least one data access policy entered or selected by a user on a management platform;

receiving, by the target storage node, a first write data stream from a request client, wherein the first write data stream indicates a first tape, first data to be written into the first tape, and first tape space required by the first data, and wherein the first tape space is assigned to a same data partition allocated to at least one storage node in a storage node cluster to which the target storage node belongs; and writing, by the target storage node, the first data into the first tape according to the at least one data access policy using a first tape drive in at least one tape drive associated with the target storage node.

2. The method according to claim 1, further comprising receiving different write data streams, wherein a concurrency quantity of the different write data streams is less than or equal to a first value, and wherein the first value is a minimum value of quantities of tape drives of a plurality of storage nodes comprised in the storage node cluster.

3. The method according to claim 2, wherein the at least one data access policy comprises a load balancing policy, wherein the load balancing policy comprises a ping-pong policy or a round-robin policy, and wherein the load balancing policy is configured to perform load balancing on the different write data streams.

4. The method according to claim 1, wherein the at least one data access policy comprises a first scheduling policy, and wherein writing the first data into the first tape according to the at least one data access policy comprises:

suspending, according to the first scheduling policy when the first tape is faulty, receiving a first write request corresponding to the first write data stream; and when the first tape is switched to a second tape, resuming receiving the first write request and writing the first data of the first write data stream into the second tape.

5. The method according to claim 1, further comprising performing redundancy backup on the first write data stream using a redundancy policy, wherein the redundancy policy comprises multi-copy or erasure code, wherein the at least one data access policy comprises a second scheduling policy, and wherein writing the first data into the first tape according to the at least one data access policy comprises:

according to the second scheduling policy when the first tape drive is faulty, receiving a first write request corresponding to the first write data stream; and notifying an associated storage node to mark an associated tape drive of the first write data stream as being in an idle state, wherein the associated storage node is in the storage node cluster and wherein the associated tape drive is in the associated storage node.

6. The method according to claim 1, further comprising:

receiving a read request indicating a third tape and an on-tape offset address in which second data is located; and reading, based on the on-tape offset address, the second data from the first tape using a second tape drive associated with the target storage node.

7. The method according to claim 6, wherein the at least one data access policy comprises a third scheduling policy indicating that the second tape drive is an idle tape drive of the target storage node.

8. The method according to claim 6, wherein the at least one data access policy comprises a fourth scheduling policy, and wherein writing the first data into the first tape according to the at least one data access policy comprises:

receiving the first data of the first write data stream to be written;

suspending, according to the fourth scheduling policy when the third tape is the same as the first tape, receiving a first write request corresponding to the first write data stream;

writing the first data;

executing, after the first data is written, the read request using the third second tape drive in order to read the second data from the first tape, wherein the second tape drive is the same as the first tape drive; and resuming, after the read request is executed, receiving the first write request.

9. The method according to claim 6, wherein the at least one data access policy comprises a fifth scheduling policy, and wherein writing the first data into the first tape according to the at least one data access policy comprises:

selecting, according to the fifth scheduling policy when the third tape is different from the first tape and when there is no idle tape drive associated with the target storage node, a tape drive corresponding to a second write data stream as the second tape drive, wherein the second write data stream belongs to at least one concurrent write data stream of the target storage node, and wherein the second write data stream is the same as or different from the first write data stream;

receiving the second data of the second write data stream to be written;

suspending receiving a second write request corresponding to the second write data stream;

writing the second data;

executing, after the second data is written, the read request using the second tape drive; and resuming, after the read request is executed, receiving the second write request.

10. A computing device cluster, comprising:

at least one computing device, comprising:

a memory configured to store instructions; and one or more processors coupled to the memory and configured to execute the instructions to cause the computing device cluster to:

determine at least one data access policy entered or selected by a user on a management platform;

receive a first write data stream from a request client, wherein the first write data stream indicates a first tape, first data to be written into the first tape, and first tape space required by the first data, and wherein the first tape space is assigned to a data partition allocated to at least one storage node in a storage node cluster to which a target storage node belongs; and write the first data into the first tape according to the at least one data access policy using a first tape drive associated with the target storage node.

11. The computing device cluster according to claim 10, wherein the one or more processors are further configured to execute the instructions to cause the computing device cluster to receive different write data streams, wherein a concurrency quantity of the different write data streams is less than or equal to a first value, and wherein the first value is a minimum value of quantities of tape drives of a plurality of storage nodes comprised in the storage node cluster.

12. The computing device cluster according to claim 11, wherein the at least one data access policy comprises a load balancing policy, wherein the load balancing policy comprises a ping-pong policy or a round-robin policy, and wherein the load balancing policy is configured to perform load balancing on the different write data streams.

13. The computing device cluster according to claim 10, wherein the at least one data access policy comprises a first scheduling policy, and wherein the one or more processors are further configured to execute the instructions to cause the computing device cluster to further write the first data into the first tape by:

suspending, according to the first scheduling policy when the first tape is faulty, receiving a first write request corresponding to the first write data stream; and resuming, after the first tape is switched to a second tape, receiving the first write request, and writing the first data of the first write data stream into the second tape.

14. The computing device cluster according to claim 10, wherein the at least one data access policy comprises a second scheduling policy, and wherein the one or more processors are further configured to execute the instructions to cause the computing device cluster to further write the first data into the first tape according to the at least one data access policy by:

performing redundancy backup on the first write data stream using a redundancy policy, wherein the redundancy policy comprises multi-copy or erasure code;

suspending, according to the second scheduling policy when the first tape drive is faulty, receiving a first write request corresponding to the first write data stream; and notifying an associated storage node to mark an associated tape drive of the first write data stream as being in an idle state, wherein the associated storage node is in the storage node cluster and is configured to perform redundancy backup on the first write data stream, and wherein the associated tape drive is in the associated storage node.

15. The computing device cluster according to claim 10, wherein the one or more processors are further configured to execute the instructions to cause the computing device cluster to:

receive a read request indicating a third tape and an on-tape offset address in which second data is located; and read, based on the on-tape offset address, the second data from the first tape using a second tape drive associated with the target storage node in the at least one.

16. The computing device cluster according to claim 15, wherein the at least one data access policy comprises a third scheduling policy indicating that the second tape drive is an idle tape drive of the target storage node.

17. The computing device cluster according to claim 15, wherein the at least one data access policy comprises a fourth scheduling policy, and wherein the one or more processors are further configured to execute the instructions to cause the computing device cluster to further write the first data into the first tape according to the at least one data access policy by:

receiving the first data of the first write data stream to be written;

suspending, according to the fourth scheduling policy when the third tape is the same as the first tape, receiving a first write request corresponding to the first write data stream;

writing the first data;

executing, after the first data is written, the read request using the second tape drive in order to read the second data from the first tape, wherein the second tape drive is the same as the first tape drive; and resuming, after the read request is executed, receiving the first write request.

18. The computing device cluster according to claim 15, wherein the at least one data access policy comprises a fifth scheduling policy, and wherein the one or more processors are further configured to execute the instructions to cause the computing device cluster to further write the first data into the first tape according to the at least one data access policy by:

selecting, according to the fifth scheduling policy when the third tape is different from the first tape and there is no idle tape drive associated with the target storage node, a tape drive corresponding to a second write data stream as the second tape drive, wherein the second write data stream belongs to at least one concurrent write data stream of the target storage node, and wherein the second write data stream is the same as or different from the first write data stream;

receiving the second data of the second write data stream to be written;

suspend receiving a second write request corresponding to the second write data stream;

writing the second data;

executing, after the second data is written, the read request using the second tape drive; and resuming, after the read request is executed, receiving the second write request.

19. A computer program product comprising instructions that are stored on a non-transitory computer-readable medium and that, when executed by one or more processors, cause a computing device cluster to:

determine at least one data access policy entered or selected by a user on a management platform;

receive a first write data stream from a request client, wherein the first write data stream indicates a first tape, first data to be written into the first tape, and first tape space required by the first data, and wherein the first tape space is assigned to a data partition allocated to at least one storage node in a storage node cluster to which a target storage node belongs; and write the first data into the first tape according to the at least one data access policy using a first tape drive associated with the target storage node.

20. The computer program product according to claim 19, wherein the instructions, when executed by the one or more processors, further cause the computing device cluster to receive different write data streams, wherein a concurrency quantity of the different write data streams is less than or equal to a first value, and wherein the first value is a minimum value of quantities of tape drives of a plurality of storage nodes comprised in the storage node cluster.

* * * * *